US008971532B1

(12) United States Patent
 Milstein

(10) Patent No.: US 8,971,532 B1
(45) Date of Patent: Mar. 3, 2015

(54) SYSTEM AND METHODS FOR PROTECTING VIDEO CONTENT

(71) Applicant: Jaime Milstein, Los Angeles, CA (US)

(72) Inventor: Jaime Milstein, Los Angeles, CA (US)

(73) Assignee: Exaimage Corporation, Los Angeles, CA (US)

( * ) Notice: Subject to any disclaimer, the term of this patent is extended or adjusted under 35 U.S.C. 154(b) by 65 days.

(21) Appl. No.: 13/778,523

(22) Filed: Feb. 27, 2013

Related U.S. Application Data

(63) Continuation-in-part of application No. 13/275,292, filed on Oct. 17, 2011, and a continuation-in-part of application No. 13/007,670, filed on Jan. 17, 2011, now Pat. No. 8,750,383.

(51) Int. Cl.
 *G06F 21/00* (2013.01)
 *G06F 21/60* (2013.01)
(52) U.S. Cl.
 CPC .................................. *G06F 21/602* (2013.01)
 USPC ............ 380/201; 380/210; 382/235; 713/176
(58) Field of Classification Search
 USPC ....................................................... 380/201
 See application file for complete search history.

(56) References Cited

U.S. PATENT DOCUMENTS

| | | | | |
|---|---|---|---|---|
| 6,505,299 | B1 * | 1/2003 | Zeng et al. ..................... | 713/160 |
| 7,007,170 | B2 * | 2/2006 | Morten .......................... | 713/193 |
| 7,221,761 | B1 * | 5/2007 | Deshpande et al. ........... | 380/216 |
| 7,526,650 | B1   | 4/2009 | Wimmer | |
| 7,702,101 | B2 * | 4/2010 | Malcolm et al. ................ | 380/37 |
| 8,543,804 | B2 * | 9/2013 | Moon et al. .................... | 713/150 |
| 8,731,193 | B2 * | 5/2014 | Farkash et al. ................ | 380/210 |
| 2002/0131505 | A1 * | 9/2002 | Vidunas .................... | 375/240.19 |
| 2004/0101137 | A1 * | 5/2004 | Koto et al. ..................... | 380/201 |
| 2004/0174998 | A1 * | 9/2004 | Youatt et al. .................. | 380/210 |
| 2005/0047509 | A1   | 3/2005 | Lee et al. | |
| 2005/0074120 | A1 * | 4/2005 | Vidakovic ..................... | 380/255 |
| 2005/0195975 | A1 * | 9/2005 | Kawakita ........................ | 380/30 |
| 2007/0083467 | A1 * | 4/2007 | Lindahl et al. .................. | 705/50 |
| 2010/0246819 | A1   | 9/2010 | Candelore | |
| 2010/0278338 | A1   | 11/2010 | Chang et al. | |
| 2012/0195425 | A1   | 8/2012 | Kim et al. | |

OTHER PUBLICATIONS

Leiss, E., 'Time-Variant Watermarking of MPEG-Compressed Digital Videos', CLEI Electronic Journal, vol. 8,No. 1, Aug. 2005, entire document, http://www.clei.org/cleiej/papers/v8i1p1.pdf.*
Miller, M., et al, 'A Review of watermarking principles and practices', IEEE, 1998, entire document, http://www0.cs.ucl.ac.uk/staff/I.Cox/Content/papers/1999/bookchapter99.pdf.*

* cited by examiner

*Primary Examiner* — Christopher Brown
*Assistant Examiner* — Ronald Baum
(74) *Attorney, Agent, or Firm* — Cotman IP Law Group, PLC

(57) ABSTRACT

Systems and methods for content-protecting video codecs are described. At least one embodiment of the invention comprises a system for protecting video content comprising computer memory comprising a stored set of instructions for processing video data; and at least one microprocessor configured to process the video data according to the stored set of instructions, the stored set of instructions requiring identification of data to be removed, at least a portion of which is essential to obtaining a visually acceptable reproduction of video, the stored set of instructions being further configured to replace removed data with data-hiding values, wherein the visually acceptable reproduction of video cannot be generated without a key that enables recovery of enough of the removed data from the data-hiding values that replaced the removed data.

26 Claims, 9 Drawing Sheets

SYSTEM AND METHODS FOR PROTECTING VIDEO CONTENT

CROSS-REFERENCE TO RELATED APPLICATIONS

The present application is a continuation in part of U.S. patent application Ser. No. 13/007,670, filed on Jan. 17, 2011, and is also a continuation in part of U.S. patent application Ser. No. 13/275,292, filed on Oct. 17, 2011, all of which are herein incorporated by reference for completeness of disclosure.

BACKGROUND OF THE INVENTION

1. Field of the Invention

Embodiments of the invention described herein pertain to the field of video data. More particularly, but not by way of limitation, one or more embodiments of the invention enable systems and methods for content-protecting video codecs.

2. Description of the Related Art

Security provisions are important when providing, encoding, and decoding video data for display. Although security provisions are not usually considered part of a video codec, they can be essential to codec operation. For example, security may be desirable to the video content provider to prevent copyright infringement. Video content owners are chronic victims of illegal video capture and knock-offs.

Furthermore, the codec provider may want to protect codec software from capture, reverse engineering, or to compromise other security features, such as features designed to prevent copyright infringement.

In the video encoding and decoding process, several vulnerabilities exist that require systems and methods for implementing codec security. The system is typically susceptible to security issues whenever data is accessible to a third party, such as during transmission to the video encoder, between the encoder and media device, on the media device, between the media device and the video decoder, during transmission between the video encoder and the video decoder, and between the video decoder and the display.

Some potential vulnerabilities can be reduced or eliminated, depending on the security of various components of the transmission medium. For example, there would be no risk of security issues between the video encoder and the media device if the transfer occurred in a secured environment. Other methods may reduce the security risk during transmission between the video encoder and the video decoder, such as when the output of an Earth-based encoder is uplinked to a satellite using a highly directional antenna.

For the most part, however, risk reduction requires some form of password protection, encryption, or the like. The nature of digital video can complicate some protection mechanisms and simplify others. Consider the problem of protecting video content streaming on the Internet. If the video data is encrypted, it can be streamed, collected, restreamed, etc., in the clear and without security concerns. However, such encryption poses various problems.

First, encryption significantly multiplies the amount of data that must be streamed. Second, decryption, which must occur before decoding, can add an intolerable processing burden, making 24 fps video display impossible. Suppose we wish to stream an encoded high definition video across the Internet to the user's computer, which is running decoder software. Bandwidth critically limits the amount of data that can be streamed per unit time—that is, the video data rate. HD data rates must be reduced if necessary to satisfy such bandwidth constraints. H.264 and HEVC codecs can do this, but reduction of data rate translates to reduction of visual quality. If e is the encryption efficiency, where n/e bits of data are required to encrypt n bits of unencrypted data, then available bandwidth has been reduced by a factor of 1/e, and video quality must suffer accordingly.

Second, decryption is a processing-intensive operation. Unless it is implemented in hardware (that is, there is a box or special purpose chip), decryption competes with the decoder for processing resources. Software decryption is well known for introducing latency. Such latency is tolerable for small jobs, but a video stream with accumulating latency is clearly unacceptable for video presentation. In short, the computational 'stress' of dealing with both decryption and decoding may make the whole process unworkable.

To overcome the problems and limitations described above there is a need for systems and methods for protecting video content.

BRIEF SUMMARY OF THE INVENTION

One or more embodiments of systems and methods for protecting video content described herein provide powerful video content protection without impeding full speed video decoding and/or reproduction, whether software, firmware, or hardware-based. The systems and methods for-protecting video content work with almost any form of data protection, including data scrambling and powerful government standards like AES-256 encryption. The systems and methods for protecting video content also work for any resolution video, including high definition and ultra-high definition. The systems and methods for protecting video content are applicable to image and video processing systems and are compatible with a broad range of video codecs. When applied to a compatible video codec, video decoding and display can be achieved at full 24 frames-per-second frame rate or greater, for true video viewing. The systems and methods for protecting video content described herein can be configured to provide unprecedented safeguards against video piracy and fully protect video content. Copies of protected video content are just as strongly protected as the original video content, reducing or eliminating illicit content proliferation. For a video codec this protection exists from the completion of the encoding process to the completion of the decoding process, including the marketing, sale, and distribution of encoded video storage devices. These systems and methods are also applicable to low frame-rate video and sequential imagery applications, including satellite low-frame rate sequential image transmission, many 'video' surveillance systems, the rapidly developing signage industry, and confidential 3-dimensional medical imagery, such as CT-scans, MRIs, and MRAs.

One or more embodiments of the systems and methods for protecting video content described herein are elaborated on herein. At least one embodiment is directed to a special purpose computer system for protecting video content. This special purpose computer system comprises the components of a computer system well known to those of ordinary skill in the art and computer memory that has a stored set of instructions for processing video data. The special purpose computer system further comprises at least one microprocessor configured to process the video data according to the stored set of instructions. The stored set of instructions requires identification of data to be removed, at least a portion of which is essential to obtaining a visually acceptable reproduction of video. The stored set of instructions is further configured to replace removed data with data-hiding values. The visually acceptable reproduction of video cannot be generated without a key that enables recovery of enough of the removed data from the data-hiding values that replaced the removed data. The data-hiding values may comprise encrypted data and/or replacement data that was directly substituted for at least some of the removed video data. In at least one instance, the key utilized by the system is an encryption key. The key may be device dependent. For example, the key may be dependent on at least one factor selected from a group comprising a video identifier, a video content owner, a video provider, one or more user identities, an encoder instance, an encoding system, a password, a time of encoding, a storage device, a storage device identifier, a storage device configuration, an authorized processing device, an authorized display system, a Digital Rights Management (DRM)-generated proviso, a membership status, or a geographical location. In one or more embodiments of the system described in this disclosure the data to be removed is separated from a remainder of the video data. The video data may comprise video data of any sort such as video distributed over the internet, video played back through hardware devices, or satellite transmission video data. In the system embodiment the at least one microprocessor is configured to apply at least one wavelet transform to the video data k times to generate image $P_k$ and associated support spaces $S_1, \ldots, S_k$, where k is an integer greater than 0, and the at least one microprocessor is configured to identify the data to be removed and the data to be removed includes at least some data from $P_k$. The wavelet transform can be a Daubechies wavelet transform or any other wavelet transform suitable for achieving the implementation described herein. The set of instructions uses the key to obtain enough of the removed video data from the data-hiding values to achieve the visually acceptable reproduction of video. By implementing the technique described here the set of instructions generates at least one displayable video frame that is visually acceptable to a viewer.

One or more embodiments of the invention are directed to a method for protecting video content. The method executes on hardware devices having at least one processor able to execute computer-readable instructions. The method comprises the steps of obtaining video data comprising at least one channel of at least one video frame; applying at least one wavelet transform to the at least one channel of the at least one video frame k times to generate image data comprising $P_k$ and associated support spaces $S_1, \ldots, S_k$, where k is an integer greater than 0; identifying a portion of the video data that includes an essential portion of the video data required for visually acceptable reproduction of the at least one channel, where the essential portion comprises at least one datum from image $P_k$; and generating modified image data by replacing the at least one datum with data-hiding data such that after replacement the visually acceptable reproduction of the at least one channel cannot be generated from the modified image data without a key. The method further comprises the steps of outputting the modified image data as a compressed version of the at least one video frame. The compressed version of the at least one video frame is output as at least one video stream in at least one embodiment. In one implementation of the method at least some of the data-hiding data is stored in a header associated with the at least one video frame although the data-hiding data may also be stored elsewhere. In the method, the essential portion of the video data is removed from frame data of the at least one video frame leaving remaining frame data. The data-hiding data may be treated differently from the remaining data. The at least one datum is directly substituted with data-hiding data in one or more instances of the method. The video data may comprises all sorts of digital video data sources, such as video data distributed over a network, video data played directly on hardware devices, and/or satellite video transmissions. The key utilized in one or more embodiments of the invention is device dependent. The key may, for example, be dependent on at least one factor selected from a group comprising a video identifier, a video content owner, a video provider, one or more user identities, an encoder instance, an encoding system, a password, a time of encoding, a storage device, a storage device identifier, a storage device configuration, an authorized processing device, an authorized display system, a DRM-generated proviso, a membership status, and a geographical location. The method may utilize an inverse wavelet transform by applying the j times at least one inverse wavelet transform to a modified $P_k$ and modified $S_k$ in the modified image data, where j is an integer greater than 0. In one or more embodiments of the invention the method utilizes a video decoder configured to generate a decoded video stream of the digital video data stream, wherein the video decoder comprises: accepting the modified image data comprising the compressed version of the at least one video frame; processing the at least one compressed version of the at least one video frame to generate at least one expanded video frame; identifying data comprising the essential portion in the at least one expanded video frame; restoring enough of the essential portion based on the data-hiding data and the key to generate a visually acceptable reproduction of video; applying an inverse wavelet transform j times to the at least one expanded video frame to generate at least one visually acceptable reproduction of the at least one video frame, where j is an integer greater than 0 and less than or equal to the k; and preparing at least one displayable video frame based on the visually acceptable reproduction of video.

One or more embodiments of the invention are implemented in special purpose integrated circuitry. In such an instance the method is implemented via the integrated circuitry. Thus one or more embodiments of the invention are summarized as a system for protecting video content comprising: computer memory comprising a stored set of instructions for processing video data; and special purpose integrated circuitry configured to process the video data according to the stored set of instructions, the stored set of instructions requiring identification of data to be removed, at least a portion of which is essential to obtaining a visually acceptable reproduction of video, the stored set of instructions being further configured to replace removed data with data-hiding values, wherein the visually acceptable reproduction of video cannot be generated without a key that enables recovery of enough of the removed data from the data-hiding values replaced the removed data.

Although the examples given throughout this specification are illustrated through a discussion of video data the method is also applicable to image data. The image data may later be assembled into video data or kept as individual images. In such an instance the method for protecting image data as implemented by at least one processor able to execute computer readable instructions comprises: obtaining image data comprising; applying at least one wavelet transform to the image data k times to generate an instance of the image data comprising $P_k$ and associated support spaces $S_1, \ldots, S_k$, where k is an integer greater than 0; identifying a portion of the image data that includes an essential portion of the image data required for visually acceptable reproduction of an image, where the essential portion comprises at least one datum from the instance of the image data comprising $P_k$; and generating modified image data by replacing the at least one datum with data-hiding data such that after replacement the visually acceptable reproduction of the image cannot be generated from the modified image data without a key.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
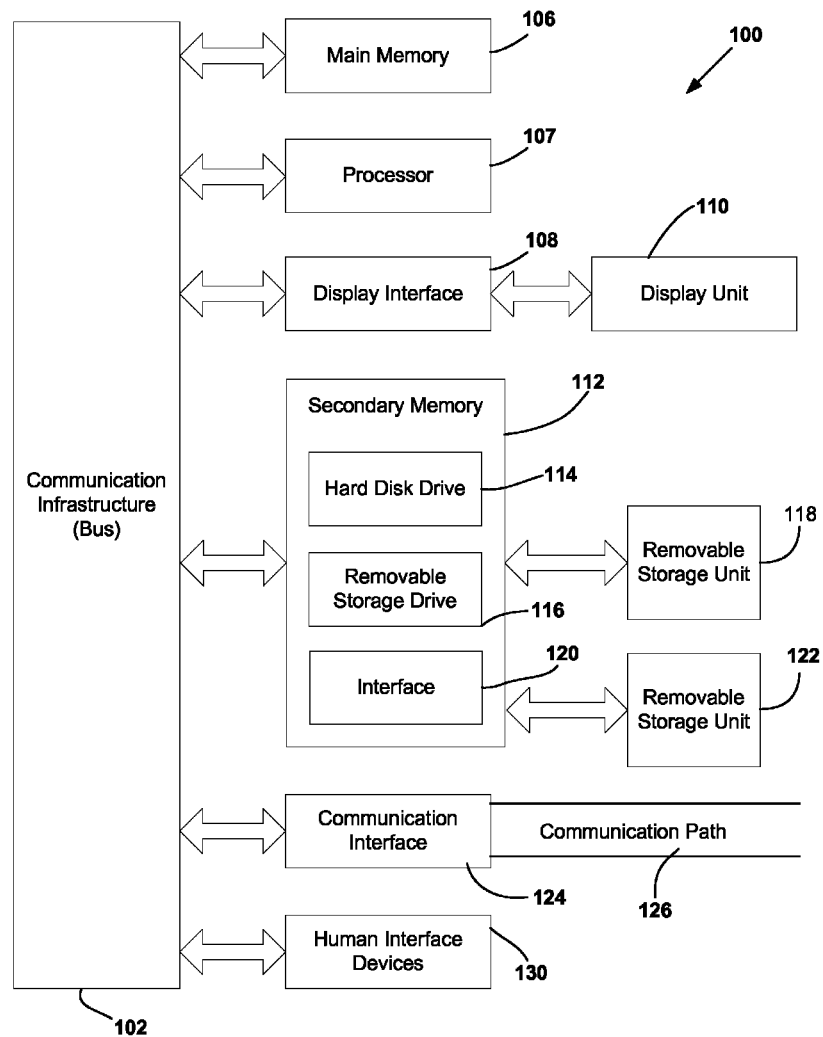
FIG. 1 illustrates a general-purpose computer and peripherals that when programmed as described herein may operate as a specially programmed computer in accordance with one or more embodiments of systems and methods for protecting video content described herein.

Systems and methods for protecting video content will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

As used herein, the terms "first", "second" and the like do not denote any order, quantity or importance, but rather are used to distinguish one element from another, and the terms "a" and "an" herein do not denote a limitation of quantity, but rather denote the presence of at least one of the referenced item.

As used herein, the term "video frame" or "video image" refers to any frame of a video to be displayed sequentially at a frame rate. Typically, a frame of a video is represented by an image.

As used herein, the term "data hiding" refers to any method for masking, scrambling, encrypting, or otherwise making it impractical to recover data in a form suitable for its intended use without using a key, as broadly defined below.

As used herein, the term "key" refers to any additional information such as an encryption key, password, token, or any other additional information that may be used for revealing the hidden data under appropriate conditions. As used herein, the term "encryption key" refers to additional information used in a decryption process to reveal hidden data that is encrypted.

As used herein, the term "frame data" refers to any data, including data that has resulted from or been subjected to data hiding, that represents or encodes a complete or partial video frame or subset of video frames, or results from any sequence of processes applied to a complete or partial video frame or subset of video frames, and encompasses any input, handoff product, or output that arises from processing a complete or partial video frame or subset of video frames. Unless otherwise specified, an instance of frame data may refer to any data that represents, encodes, or encrypts a complete or partial video frame or subset of video frames at any stage of processing, including input data, output data, as well as data that is processed or otherwise modified.

As used herein, the term "stream" refers to a sequence of frames that can be rendered to produce the time-dependent view of the visually perceptible content.

As used herein, the term "streaming" refers to term the delivery of media for real-time processing and/or viewing. Streaming may include but is not limited to: "true streaming" which herein refers to streaming that matches the available bandwidth; and "progressive download" which herein refers to the delivery of media in a manner that may be processed and/or viewed prior to complete transfer.

As used herein, the term "original video frame" refers to a video frame originally input to encoding processing system, whether that video frame is raw video data such as generated within a video camera, output from a video camera, a partially processed image (as might be generated by a video preprocessing system internal or external to the video camera that captured the image), mezzanine video (i.e., almost losslessly compressed movie master-quality digital video), or decoded video that has been subjected to lossy or lossless compression, whether in accord with a video standard (e.g., H.264 and HEVC) or otherwise.

As used herein, the expression "visually acceptable reproduction" refers to any processed version of a video frame and/or a plurality of video frames that would be considered an acceptable substitute for the original video frame and/or plurality of video frames with respect to viewing quality and reproduction accuracy.

As used herein, the term "encode" refers to the process of a video processing system that generates output data based on input of a plurality of video frames such that a semblance of the input video frames can be reproduced by processing the output data appropriately. Encoding includes lossless or lossy encoding.

As used herein, the term "encoder" refers to any device, software, or combination thereof capable of encoding a plurality of video frames.

As used herein, the term "decoder" refers to any device, software, or combination thereof capable of generating a plurality of video frames from encoded data.

As used herein, the term "decode" refers to generating a plurality of video frames from output data of a video encoder by a video decoder.

As used herein, the term "codec" refers to any system that implements an encoder together with a system that implements a decoder of the video data produced by that encoder, and one or more processes that may facilitate the efficiency or effectiveness of the codec, whether hardware, firmware, software, or any combination thereof.

Codecs include any existing or future codec, including codecs conforming to any proprietary format and/or video coding standard, such as HEVC, H.264, VC1, MPEG-4, MPEG-2, or any other video coding standard.

As used herein, the expression "high definition video encoding" refers to the encoding of video with a resolution of at least 1280×720i high definition at 24 frames per second. As used herein, the expression "high definition video encoder" refers to a video encoder with the ability to perform video encoding up to high definition video encoding. Thus, a "high definition video encoder" includes the ability to encode lower resolution video.

As used herein, the term "support data" refers to at least one point and/or its value in a support array of at least one level of one channel of a video frame.

As used herein, the term "DCT-based codec" refers to any codec that applies at least one discrete cosine transform (DCT) to encode data and/or applies at least one inverse DCT (IDCT) to decode data.

As used herein, the terms "wavelet-based video codec" and "wavelet-based codec" refers to any codec that applies at least one wavelet transform (WT) to encode data and/or applies at least one inverse WT (IWT) to decode data.

As used herein, the expression "an essential data containing (EDC) dataset" refers to a set of data, derived from an image or video, that includes a subset of video data essential to the reconstruction of a visually acceptable reproduction of the original image or video.

As used herein, the expression "an essential subset of an EDC dataset" refers to a subset of an EDC dataset such that an acceptable reproduction of the original image or video can be reconstructed from the combination of that data subset and the frame data remaining after the removal of the EDC dataset.

As used herein, the expression "content-protecting video codec" refers to a video codec that hides enough video data prior to storage and/or retrieval so that, without using some of the hidden data, a satisfactory reproduction of the input video is not feasible.

As used herein, the term "relabeling" refers to any method or methods of renaming, re-encoding, reformatting, or re-representing data. Typically, relabeling is performed to facilitate concise, compact, or efficient representation of data. Relabeling usually involves some form of entropy encoding e.g. Huffman encoding, arithmetic encoding like Context-adaptive binary arithmetic coding (CABAC), or ran-length encoding (RLE), etc.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as Secondary memory 112. Secondary memory 112 may comprise, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication path 126 may comprise any type of telecommunication network or interconnection fabric that can transport data to and from communication interface 124.

To facilitate user interaction with the specially programmed computer system, one or more human interface devices (HID) 130 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resource are made available on demand over the Internet or any other network. In one or more embodiments, the system may also encompass parallel systems, multi-processor systems, multi-core processors, and/or any combination thereof. Where a virtual machine, process, device or otherwise performs substantially similarly to that of a physical computer system, such a virtual platform will also fall within the scope of disclosure provided herein, notwithstanding the description herein of a physical system such as that in FIG. 1.

Figure 2A:
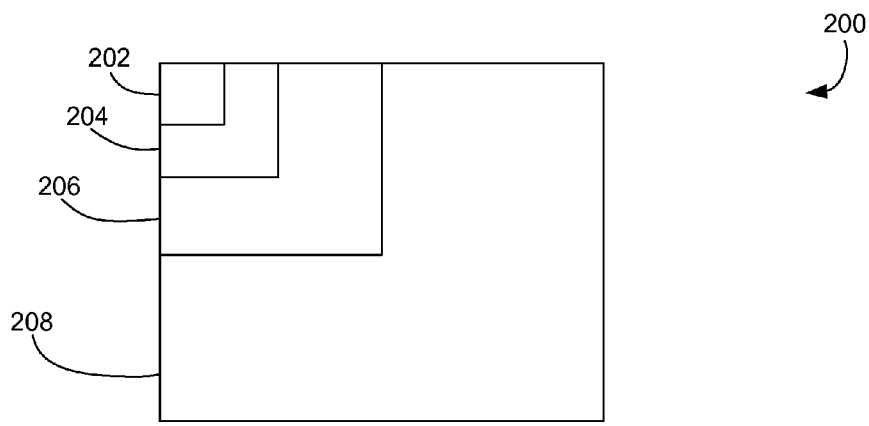
FIGS. 2A-2B illustrate an exemplary relationship between a pixel in image space and the spatial locations of the points in the wavelet transform space that constitute the support of that pixel in accordance with one or more embodiments of systems and methods for protecting video content described herein.
Figure 2B:
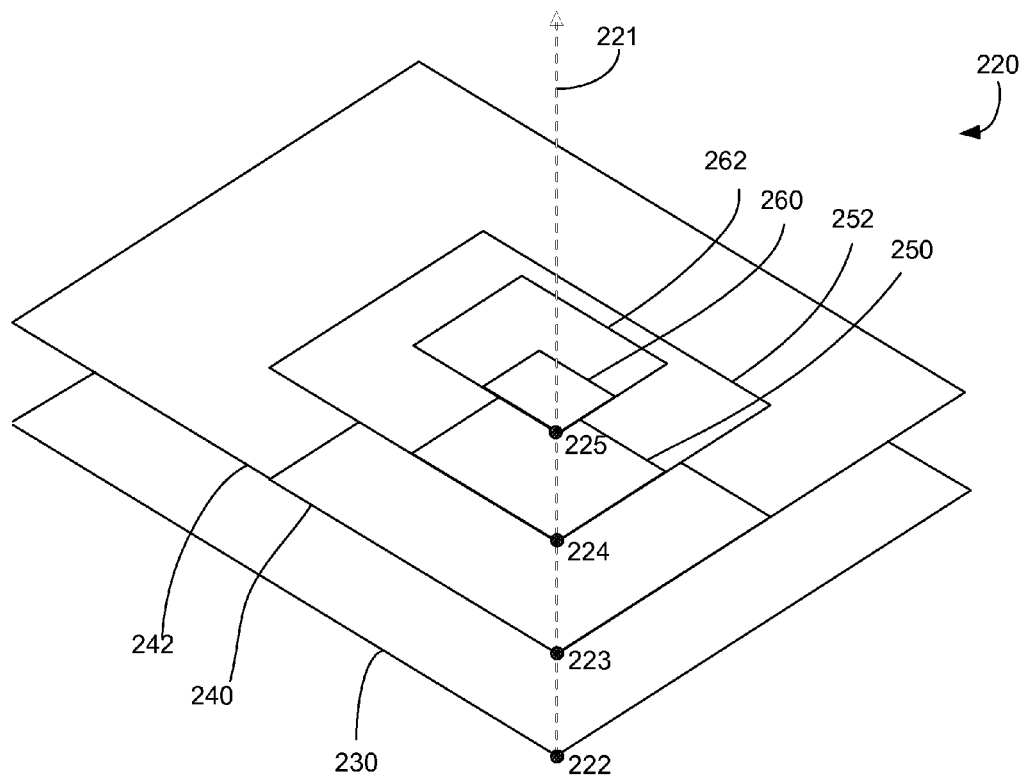

FIGS. 2A-2B illustrate an exemplary relationship between a pixel in image space and the spatial locations of the points in the wavelet transform space that constitute the support of that pixel in accordance with one or more embodiments of systems and methods for protecting video content described herein.

In one or more wavelet-based codecs, a wavelet transform (WT) is applied to a video frame to generate preview data and support data. The WT is applied iteratively to each successive preview to generate the next level of preview data and support data. The original video frame is the level 0 preview data. The encoded video includes the highest-level preview data together with support data from each level.

The decoding process begins with the highest-level preview data and the highest level support data. The IWT is applied iteratively to the level n preview data and the level n support data to generate the level n−1 preview data until the approximation of the original image is created. Without preview data to start with, only an extremely poor image could be produced. Although the WT and the IWT may be performed in a lossless manner, the WT may be configured to concentrate essential data in preview data such that support data may be more highly compressed while minimizing negative effects on perceived video quality in decoded data.

For example, applying the WT may involve combining two filter operations. One filter is a low pass filter, the other a high pass filter. Each filter is applied in both the horizontal direction of the image and in the vertical direction of the image. The preview results from applying the low pass filter in both horizontal and vertical directions. The relative position of the four quadrants is arbitrary, but in those depictions, the quadrants that are placed adjacent to the preview result from applying the low pass filter in one direction and the high pass filter in the other direction, while the quadrant placed diagonally opposite the preview results from applying the high pass filter in both directions.

Although FIGS. 2A-2B are presented conceptually with respect to a video frame, FIGS. 2A-2B may apply to portions of a video frame, including but not limited to individual channels of a video frame. Although discussion involving wavelet-based codecs is grounded in iterations of a Daubechies wavelet transform and its pyramidal representation and terminology, it will be apparent to those skilled in the art that other wavelet transforms, including wavelet transforms that give rise to different geometric depictions, quadrature filter transforms, and other multiresolution transforms, could be similarly employed in systems and methods for protecting video content.

FIG. 2A illustrates a representation of exemplary data required to decode a video frame using the IWT. Although FIG. 2A shows the IWT data 200 required to decode a video frame after encoding as involving three iterations of the WT, one of ordinary skill in the art will recognize that the number of iterations can be varied without departing from the spirit or the scope of the invention.

IWT data 200 includes level 1 support data 208 generated by applying the WT to the level 0 preview data (e.g., the video frame). IWT data 200 further includes level 2 support data 206 generated by applying the WT to the level 1 preview data. IWT data 200 further includes level 3 support data 204 generated by applying the WT to the level 2 preview data. IWT data 200 further includes level 3 preview data 202, also generated by applying the WT to the level 2 preview data. In exemplary IWT data 200, level 3 preview data 202 is the highest level preview data generated by the iterative application of the WT by a video encoder.

In one or more embodiments, the video encoder uses lossy compression on at least a portion of IWT data 200.

FIG. 2B illustrates the generation of support data in preview data over multiple iterations of applying the WT. Although three iterations of the WT are shown, one of ordinary skill in the art will recognize that the number of iterations can be varied without departing from the spirit or the scope of the invention.

Iterative process 220 illustrates data generated by applying the WT at steps 222-225, where direction 221 shows the order of operation. At step 222, input data is obtained. The input data corresponds to the level 0 preview data 230 (e.g., the video frame). At step 223, after a first WT is applied to the level 0 preview data 230, level 1 preview data 240 and level 1 support data 242 are generated. At step 224, after a second WT is applied to the level 1 preview data 240, level 2 preview data 250 and level 2 support data 252 are generated. At step 225, after a third WT is applied to the level 2 preview data 250, level 3 preview data 260 and level 3 support data 262 are generated. In exemplary iterative process 220, level 3 preview data 260 is the highest level preview data generated by applying the WT iteratively.

Figure 3:
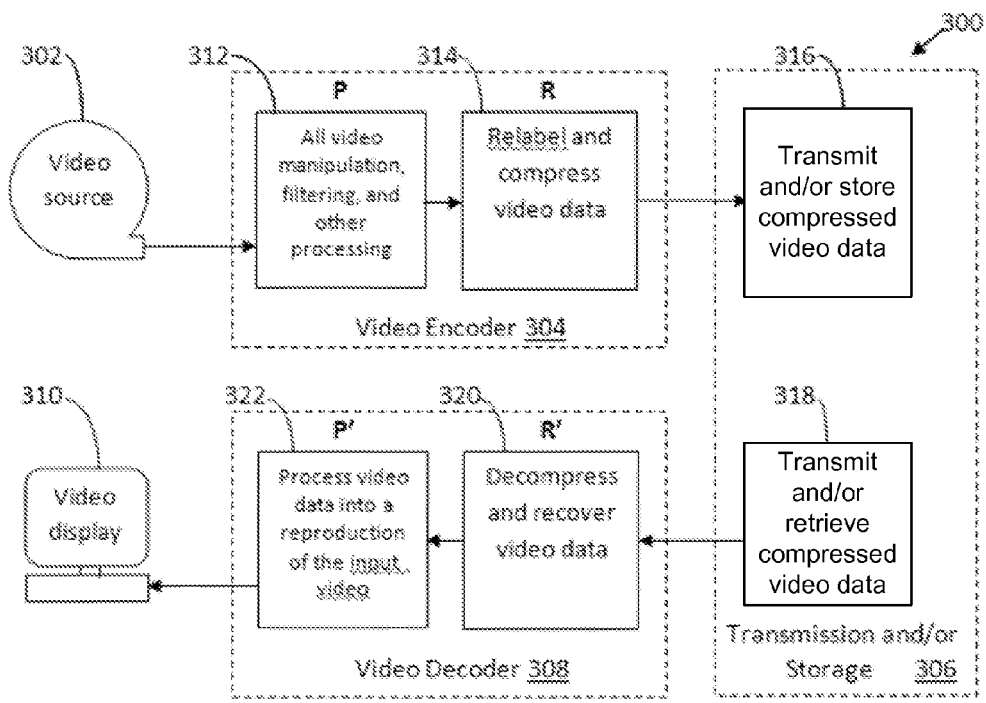
FIG. 3 illustrates an exemplary video codec system known in the art.

FIG. 3 illustrates an exemplary video codec system known in the art. A conventional video codec accepts uncompressed video data frame-by-frame from a video source, encodes and compresses the video input, and outputs the compressed video data to a transmission and/or data storage system. A transmission and/or data storage system includes any device or combination of devices configured to receive, stream, otherwise transmit and/or store data, including, hardware, software, or any combination thereof. The compressed video data is later received by a decoder, and a semblance of the input video is reproduced. System 300 is an exemplary digital video codec system as known in the art. System 300 includes digital video source 302, video encoder system 304, video transmission and/or storage system 306, video decoder system 308, and video display system 310. Systems 302, 304, 306, and 308 may be implemented in hardware, firmware, or software, individually or in any combination.

Digital video source 302 presents digitized video to video encoder 304. Video encoder 304 accepts digitized video and outputs a stream of compressed video data. Transmission and/or storage system 306 accepts compressed video data for transmission and/or storage and immediately or later outputs video data to video decoder system 308. Video decoder system 308 processes and expands video data into formatted video acceptable for display and outputs formatted video to video display system 310. Video display system 310 accepts and displays formatted video.

A conventional video codec may be conceptualized as four components:
Subsystem P (Video processing);
Subsystem R (Data relabeling);
Subsystem R' (Data expansion); and
Subsystem P' (Video reproduction).

Each subsystem is stored in computer memory and executed by way of a set of instructions processed via a microprocessor. Today's digital video encoders generally compress video data for efficient transmission and/or storage. Much of this data compression is lossless and may occur at the final stage of video encoding. Prior processing of the video facilitates lossy compression and helps maximize the compression achieved during this last stage of video encoding. Video encoder system 304 illustrates these processes as two subsystems: subsystem P 312 and subsystem R 314. Usually, processing by subsystem P 312 directly represents the spatial structure of video images, while processing by subsystem R 314 offers a more compact but abstract representation of video frame data.

Subsystem P 312 accepts formatted video data as input and typically processes video data by applying one or more of a wide variety of filters, algorithms, and other processes. One purpose of these processes is to simplify data in ways that make the final stage of video data processing highly effective in compressing that data without excessively compromising the quality of video reproduced during the video decoding process.

Subsystem R 314 receives processed video data from subsystem P 312 and applies algorithms that relabel this data and compress it as much as possible. Relabeling of video data may be accomplished using such algorithms as Huffman encoding, arithmetic encoding (e.g. CABAC), run-length encoding (RLE), other forms of entropy encoding, or some other kind of compression-enhancing relabeling. Data compression caused by subsystem R is usually lossless and reversible. The video data thus created is the major output of video encoder 304.

The video decoder 308 is prepared to accept the data stream produced by video encoder 304 and convert it to displayable video. This process is also depicted as occurring in two subsystems: subsystem R' 320 and subsystem P' 322. Usually, processing by subsystem R' 320 treats video data as a more abstract dataset, while processing by subsystem P' 322 may more directly represent the spatial structure of the video frame-like image structure of video.

Subsystem R' 320 accepts the compressed video data stream and applies algorithms that reverse the processes of subsystem R, expanding the compressed data stream and reconstructing the video data in the form that it had been input to subsystem R. This reconstructed video data is conveyed to subsystem P' 322.

Reconstructed video data from subsystem R' 320 is processed into displayable video by subsystem P' 322. The purpose of subsystem P' 322 is to create video that the viewer will perceive as a reproduction of the video that was first presented to video encoder 304.

In order to illustrate several variants of the current invention conveniently and succinctly, a diagrammatic convention is used. Applied to FIG. 3, this diagrammatic convention is suggested by Formula (1):

$$vs \to P \to R \to t/s \to R' \to P' \to vd \qquad (1)$$

In Formula (1), 'vs' represents video source 302, 't/s' represents transmission and/or storage system 306, and 'vd' represents video display system 310. Between 'vs' and 't/s' is 'P→R', representing video encoder 304. Between 't/s' and 'vd' is 'R'→P'', representing video decoder 308.

The diagram of Formula (2) is a more concise representation of the same architecture:

$$PR|R'P' \qquad (2)$$

Figure 4A:
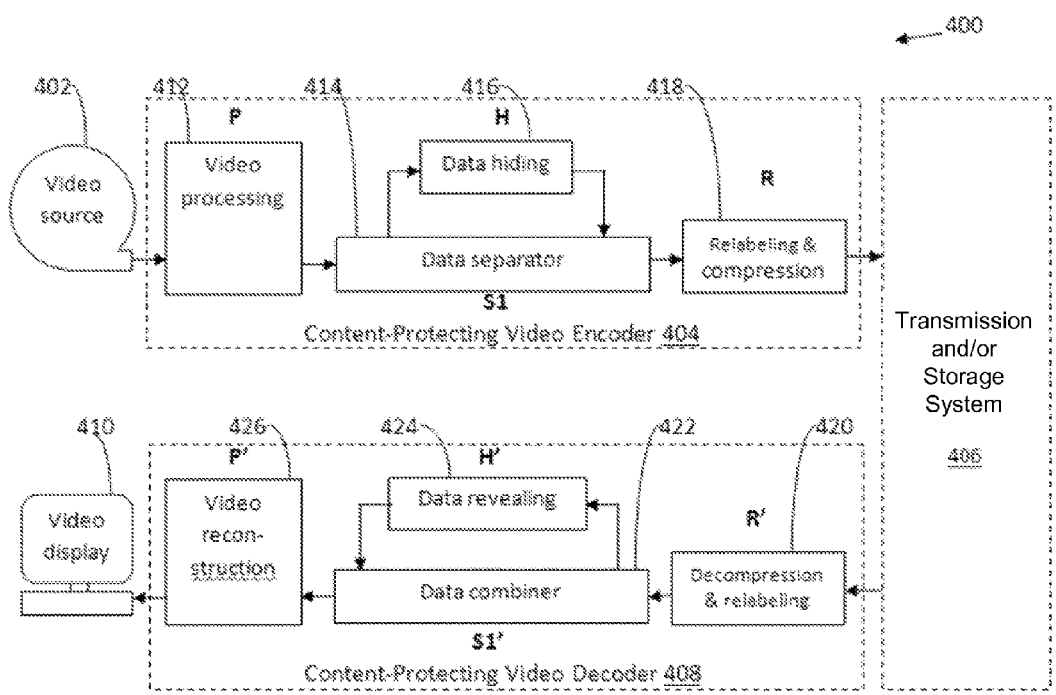
FIGS. 4A-4B illustrate exemplary content-protecting video codec systems in accordance with one or more embodiments of systems and methods for protecting video content described herein.
Figure 4B:
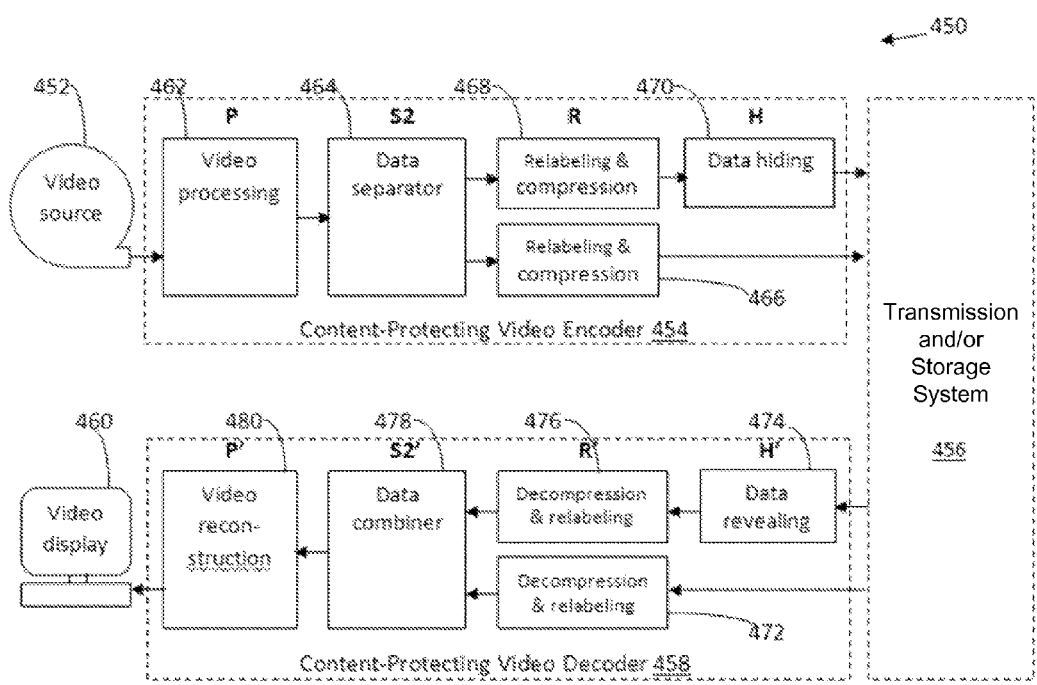

FIGS. 4A-4B illustrate exemplary content-protecting video codec systems in accordance with one or more embodiments of systems and methods for protecting video content described herein.

In addition to the components of a conventional video codec described in FIG. 3, an exemplary content-protecting video codec may be conceptualized with at least four more additional components:
Subsystem S (Data Separation);
Subsystem H (Data Concealing);
Subsystem H'—(Data Revealing); and
Subsystem S' (Data Combining).

The function of each component is now described. These functional components may be physically or logically integrated with one another, and each component may be independently implemented by software, firmware, or a computational hardware device, and/or by any other data processing technology without departing from the spirit or the scope of the invention.

FIG. 4A illustrates a system diagram of one of many generic architectures for a content-protecting video codec. More specifically, exemplary content-protecting video codec system 400 with a Case 1 data separation subsystem and data-combining subsystem is described below.

Content-protecting video codec system 400 includes digital video source 402, content-protecting video encoder system 404, transmission and/or storage system 406, content-protecting video decoder system 408, and video display system 410. Systems 402, 404, 406, and 408 may be implemented in hardware, firmware, or software, individually or in any combination.

Content-protecting video encoder system 404 may be external to transmission and/or storage system 406, may be uploadable from transmission and/or storage system 406, or may operate as software or firmware communicating via transmissions and/or operating from within storage of transmission and/or storage system 406.

Content-protecting video decoder system 408 may be external to transmission and/or storage system 406, may be uploadable from transmission and/or storage system 406, or may operate as software or firmware communicating via transmissions and/or operating from within storage of transmission and/or storage system 406.

Digital video source 402 presents digitized video to content-protecting video encoder 404. Content-protecting video encoder system 404 accepts digitized video and outputs compressed video data. Transmission and/or storage and/or retrieval system 406 accepts compressed video data for transmission, retrieval and/or storage and immediately or later outputs video data to content-protecting video decoder system 408. Video decoder system 408 processes and expands video data into formatted video acceptable for display and output formatted video to video display system 410. Video display system 410 accepts and displays formatted video.

Content-protecting video encoder system 404 includes video processing subsystem P 412 and relabeling and compression subsystem R 418. Content-protecting video encoder 404 also includes two additional components: Case 1 data separation subsystem S1 114 and data-hiding subsystem H 416. Thus, content-protecting video encoder system 404 is presented as the following subsystems: video processing subsystem P 412, data separation subsystem S1 414, data-hiding subsystem H 416, and relabeling and compression subsystem R 420.

Video processing subsystem P 412 accepts formatted video data as input and typically processes video data by applying one or more of a wide variety of filters, algorithms, and other video processing techniques. The resulting processed video data is output to data separation subsystem S1 414.

In one or more embodiments, the resulting processed video data is transformed or otherwise further processed to facilitate the decomposition of video data into two subsets, such as exemplary datasets A and B. The input video can be satisfactorily reproduced from the data in datasets A and B. Dataset A includes essential data for reproducing the input video; for a content-protecting video codec to be effective, the input video must not be suitably reproducible from dataset B alone. Although no size restrictions exist with respect to dataset A or dataset B, in one or more preferred embodiments, dataset A is a small set of data compared to dataset B. For example, the amount of data present in dataset A may constitute less than about 10%, less than about 1%, less than about 0.1%, or preferably less than about 0.05% of the original frame.

Case 1 data separation subsystem S1 414 is an exemplary implementation of a data separator subsystem S. Case 1 data separation subsystem S1 414 identifies dataset A and submits dataset A data to data-hiding subsystem H 416. Data-hiding subsystem H 416 accepts dataset A data and applies one or more techniques for rendering the data it receives into a form from which the input data is inaccessible, undecipherable, unrecoverable, or otherwise unusable for later video reconstruction without some external key, password, or other mechanism. Case 1 data separation subsystem S1 414 replaces dataset A in situ with dataset A' data determined by data-hiding subsystem H 416.

Data separation subsystem S1 414 outputs data from dataset B (with embedded dataset A' data replacing dataset A data) to relabeling and compression subsystem R 418. Relabeling and compression subsystem R 418 relabels data from datasets B and A' and compresses this data (usually losslessly). Relabeling and compression subsystem R 418 outputs this compressed data to transmission and/or storage system 406.

Transmission and/or storage system 406 may be configured to provide data transmission and/or storage and retrieval services including but not limited to compressed video data generated by content-protecting video encoder 404, and immediately or later outputs video data to content protecting video decoder 408. In one or more embodiments, transmission and/or storage system 406 transmits data generated by relabeling and compression system R 418 over one or more transmission media directly or indirectly to content-protecting video decoder 408. In one or more embodiments, transmission and/or storage system 406 includes storage that may be configured to store data including but not limited to compressed video data generated by content-protecting video encoder 404. Any storage device or storage technology may be used, including but not limited to disk storage, USB drive storage, mobile storage, cloud-based storage, computer storage, database, and/or any other data storage system, including any combination thereof. Transmission and/or storage system 406 may reside on one or more devices and/or computer systems, and may be connected via any one or more networks, such as Local Area Networks (LAN), Wide Area Networks (WAN), wireless networks, optical networks, distributed networks, the Internet or any combination thereof. In one or more embodiments, the key created for revealing hidden data works only for the specific transmitted and/or stored video instance on the specific instance of transmission and/or storage device applied in transmission and/or storage system 406.

Transmission and/or storage system 406 is configured to present relabeled and compressed combined datasets B and A' to content-protecting video decoder system 408.

Content-protecting video decoder 408 includes decompression and video data recovery subsystem R' 420 and video reconstruction subsystem P' 426. Content-protecting video decoder 408 also includes additional components: data-revealing subsystem H' and Case 1 data-combining subsystem S1'. Thus, content-protecting video decoder 408 displays the following subsystems: decompression and relabeling subsystem R' 420, data-combining subsystem S1' 422, data-revealing subsystem H' 424, and video reconstruction subsystem P' 426.

Data entering content-protecting video decoder system 408 is sent to decompression and relabeling subsystem R' 420. Decompression and relabeling subsystem R' 420 is configured to decompress and relabel received data and present the decompressed and relabeled data to Case 1 data-combining subsystem S1' 422.

Case 1 data-combining subsystem S1' 422 identifies dataset A' and submits dataset A' data to data-revealing subsystem H' 424 of content-protecting video decoder system 408. With the aid of one or more special inputs, keys, passwords, algorithms, and/or other processes, data-revealing subsystem H' 424 recreates dataset A. Case 1 data-combining subsystem S1' 422 replaces in situ dataset A' data with dataset A data. Having combined and restored datasets B and A in an appropriate data structure, Case 1 data-combining subsystem S1' 422 combines and may then further transform this data into a format suitable for video reconstruction. Case 1 data-combining subsystem S1' 422 presents this data to video reconstruction subsystem P' 426.

Video reconstruction subsystem P' 426 processes this video data into displayable video data. The output from video reconstruction subsystem P' 426 may be input to video display system 410.

FIG. 4A presents an exemplary embodiment of many configurations in which components P, S1, R, H, H', R', S1', and P' can be arranged to implement a content-protecting video codec. The architecture of the content-protecting video codec of FIG. 4A can be represented by the diagram of Formula (3):

FIG. 4B illustrates a system diagram of one of many generic architectures for a content-protecting video codec. More specifically, exemplary content-protecting video codec system 450 with a Case 2 data separation subsystem and data-combining subsystem is described below.

A major difference between FIGS. 4A and 4B is that of Case 1 data separator subsystem S1 of FIG. 4A versus Case 2 data separator subsystem S2 of FIG. 4B. The single data output stream of subsystem S1 of FIG. 4A includes both dataset B and data-hiding dataset A', with dataset A' data having been embedded in situ for dataset A. Subsystem S2 of FIG. 4B outputs datasets B and A' separately and thus supports independent processing of the two datasets.

Content-protecting video codec system 450 includes a digital video source 452, content-protecting video encoder system 454, transmission and/or storage system 456, content-protecting video decoder system 458, and video display system 460. Systems 452, 454, 456, and 458 may be implemented in hardware, firmware, or software, individually or in any combination.

Digital video source 452 presents digitized video to content-protecting video encoder system 454. Content-protecting video encoder system 454 accepts digitized video and outputs compressed video data. Transmission and/or storage system 456 accepts compressed video data for transmission and/or storage and immediately or later outputs video data to content-protecting video decoder system 458. Video decoder system 458 processes and expands video data into formatted video acceptable for display and outputs formatted video to video display system 460. Video display system 460 accepts and displays formatted video.

Content-protecting video encoder system 454 may be external to transmission and/or storage system 456. In one or more embodiments, transmission and/or storage system 456 includes storage from which content-protecting video encoder system 454 is partially or completely retrievable. In one or more embodiments, content-protecting video encoder system 454 operates as software or firmware in storage within transmission and/or storage system 456.

Content-protecting video decoder system 458 may be external to transmission and/or storage system 456, may include storage from which content-protecting video decoder system 458 is partially or completely uploadable or may operate as software or firmware within transmission and/or storage system 456

Content-protecting video encoder 454 includes video processing subsystem P 462 and relabeling and compression subsystems R 466-468. Content-protecting video encoder 454 also includes additional components: Case 2 data separation subsystem S2 464 and data-hiding subsystem H 470.

Video processing subsystem P 462 accepts formatted video data as inputs and typically processes video data by applying one or more of a wide variety of filters, algorithms, and other processing. The resulting processed video data is output to data separation subsystem S2 464.

This processed video data may be transformed, relabeled, or otherwise further processed to facilitate the decomposition of video data into datasets B and EDC dataset A. In order to retain its current data structure, dataset B may be modified by substituting unrelated data for dataset A data that has been removed from the video data.

The major function of Case 2 data separation subsystem S2 464 is to provide two outputs, one of which is dataset B, the other of which is dataset A. If the video data output from video processing subsystem P 462 is not in a form that facilitates data separation, then one function of Case 2 data separation subsystem S2 464 may be to recast the video data into a form that facilitates data separation into sets B and A.

Case 2 data separation subsystem S2 464 outputs data from dataset B to relabeling and compression subsystem 466. Relabeling and compression subsystem 466 relabels video data from dataset B and compresses this data (usually losslessly). Relabeling and compression subsystem 466 outputs the compressed data to transmission and/or storage system 456.

Case 2 data separation subsystem S2 464 outputs data from dataset A to relabeling and compression subsystem 468. Relabeling and compression subsystem 468 relabels video data from dataset A and compresses this data (usually losslessly). Subsystem 468 outputs this compressed data to data-hiding subsystem H 470.

Data-hiding subsystem H 470 applies one or more techniques for rendering the data it receives into a form from which the input data is inaccessible, undecipherable, unrecoverable, or otherwise unusable for later video reconstruction without some external key, password, or other mechanism for revealing the data originally in dataset A. Data-hiding subsystem 470 outputs data-hiding dataset A' to transmission and/or storage system 456.

Transmission and/or storage system 456 may be configured to provide data transmission and/or storage and retrieval services including but not limited to compressed video data generated by content-protecting video encoder 454, and immediately or later outputs video data to content protecting video decoder 458. In one or more embodiments, transmission and/or storage system 456 transmits data generated by relabeling and compression system R 458 over one or more transmission media directly or indirectly to content-protecting video decoder 458. In one or more embodiments, transmission and/or storage system 456 includes storage that may be configured to store data including but not limited to compressed video data generated by content-protecting video encoder 454. Any suitable storage device or storage technology may be used, including but not limited to disk storage, USB drive storage, mobile storage, cloud-based storage, computer storage, database, and/or any other data storage system, including any combination thereof. Transmission and/or storage system 456 may reside on one or more devices and/or computer systems, and may be connected via any one or more networks, such as Local Area Networks (LAN), Wide Area Networks (WAN), wireless networks, optical networks, distributed networks, the Internet, or any combination thereof. In one or more embodiments, the key created for revealing hidden data works only for the specific stored video instance on the specific instance of transmission and/or storage system 456.

Content-protecting video decoder system 458 includes decompression and relabeling subsystems R' 472 and 476 and video reconstruction subsystem P' 480. Content-protecting video decoder system 458 also includes additional components: data-revealing subsystem H' 474 and Case 2 data-combining subsystem S2' 478.

Transmission and/or storage system 456 presents two distinguishable datasets to content-protecting video decoder 458: relabeled and compressed dataset B and relabeled and compressed data-hiding dataset A'. Decompression and relabeling subsystems R' includes subsystem 472 (configured to handle dataset B), and subsystem 476 (configured to handle dataset A').

The data from relabeled and compressed dataset B is input to decompression and video data recovery subsystem 472 of content-protecting video decoder 458. Decompression and relabeling subsystem 472 decompresses the data from relabeled and compressed dataset B and recovers video dataset B. Decompression and video data recovery subsystem 472 outputs dataset B to data-combining subsystem S2' 478.

The relabeled and compressed data-hiding dataset A' is input to data-revealing subsystem 474 of content-protecting video decoder 458. With the aid of one or more special inputs, keys, passwords, algorithms, and/or other processes, data-revealing subsystem 474 extracts the relabeled and compressed data representing dataset A originally input to data-hiding subsystem 470. This relabeled and compressed data is then passed to decompression and relabeling subsystem 476.

Decompression and relabeling subsystem 476 decompresses data received from data-revealing subsystem H' 474 and recovers dataset A. Decompression and relabeling subsystem 476 further inputs dataset A to data-combining subsystem S2' 478.

Data-combining subsystem S2' 478 combines datasets B and A into an appropriate data structure and may then further transform this data into a format suitable for video reconstruction. Data-combining subsystem S2' 478 presents this data to video reconstruction subsystem P' 480.

Video reconstruction subsystem P' 480 processes this video data into displayable video data. The output from video reconstruction subsystem P' 480 is input to video display system 460.

The architecture of the content-protecting video codec of FIG. 4B can be represented by the diagram of Formula (4):

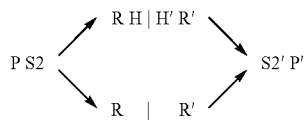

(4)

Many other generic architectures in accordance with systems and methods for protecting video content can be presented using these subsystems and this diagrammatic notation. Each generic architecture for a content-protecting video codec may offer advantages and disadvantages not found in others.

Diagrammatic Formulas (5)-(8) illustrate some of these alternative generic architectures.

(5)

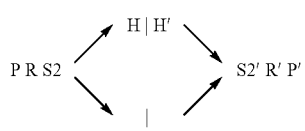

(6)

(7)

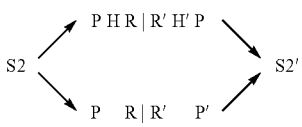

(8)

Systems and methods for protecting video content may be structured as in Formulas (5)-(8) and otherwise. Pre-separation processing associated with S2 may be represented as folded into a previous P subsystem, just as processing of a P subsystem may be represented as folded into an associated S2 subsystem without altering the actual architecture or function of the content-protecting video codec.

The processes of separation subsystem S may occur after some of the processes of subsystem P and before other processes of subsystem P. In that case, it is convenient to represent the processes of subsystems P and S as a triad $P_1 \to S \to P_2$, where the processes of subsystems $P_1$ and $P_2$ together constitute those of subsystem P. The diagram of Formula (9) is displayed using this notation:

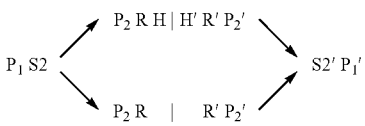

(9)

Formula (9) is a nontrivial generalization of Formulas (4) and (5). If $P_1$ is vacuous, Formula (9) reduces to Formula (5). If $P_2$ is vacuous, Formula (9) reduces to Formula (4). If neither $P_1$ nor $P_2$ is vacuous, Formula (9) represents a distinct alternate architecture for content-protecting codecs. Other diagrammatic formulas involving juxtapositions of P and S may be similarly generalized, such as those of Formulas (7) and (8) by Formula (10):

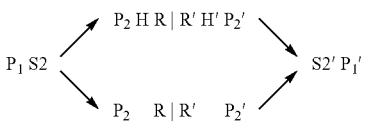

(10)

A specific implementation of a content-protecting video codec is now presented using the architecture represented by Formula (5). This video codec is a modification of any of several wavelet-based video codecs, including those described in Systems and Methods for Wavelet and Channel-Based High Definition Video Encoding, PCT Application No: PCT/US2011/067318, PCT Publication Number: WO2012/099691. In fact, several such wavelet-based video codecs have been modified as described above to become practical, effective content-protecting video codecs and have been applied to numerous video clips and movies of all kinds Each compressed video file created by these content-protecting video codecs has been decoded and played at full 24 to 60 frames per second. The reproduced video is indistinguishable from that of the unenhanced non-content-protecting video codec.

For simplicity, in discussions below, no explicit reference is made to frame headers and frame header data protection.

Frame header data may be designed to include an indispensable part of the key required for data-revealing operations pertinent to a frame or group of frames. For example, a frame header may identify the locations of dataset A or A' data, the method of data hiding used, data-hiding parameters, and seeds for pseudorandom number generators. Subjecting frame header data to data hiding provides a powerful independent preliminary layer of content protection. Revealing such hidden frame header data may indispensable to the process of revealing dataset A'. By comparison, the content protection provided by conventional header encryption is weak and may disappear entirely if frame headers are deleted.

Figure 5:
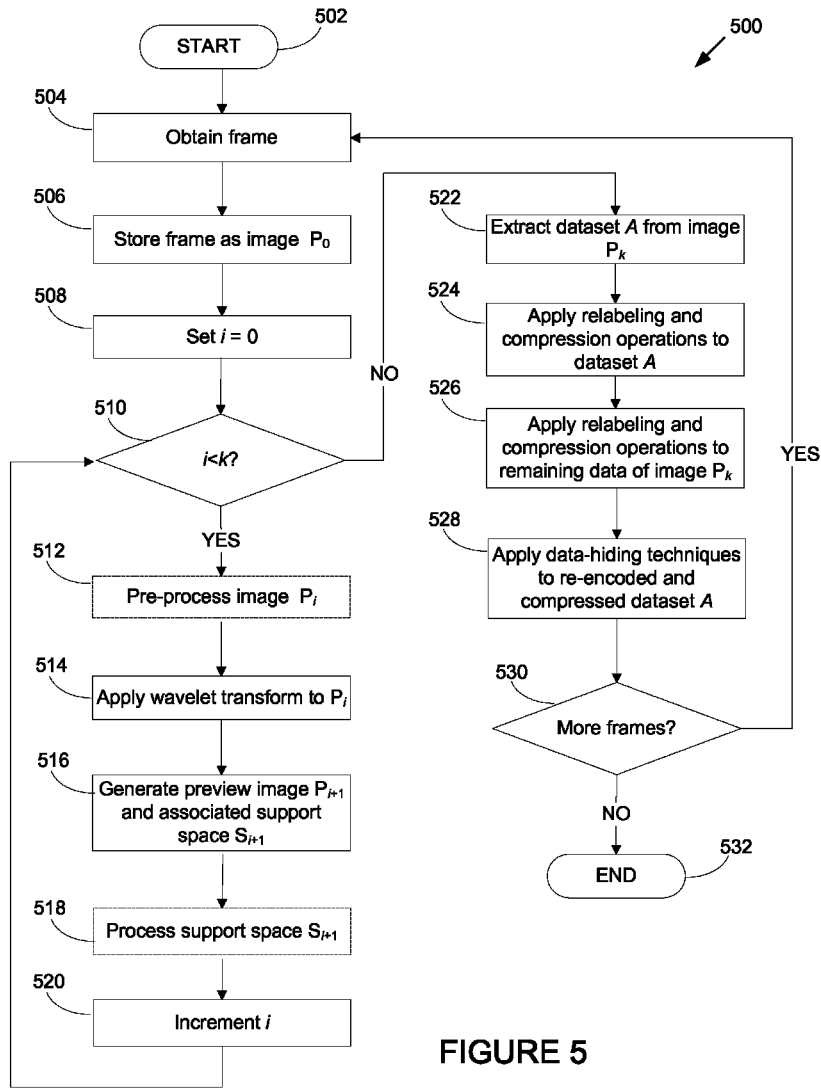
FIG. 5 is a flowchart for an exemplary process for separately processing hidden data in accordance with one or more embodiments of systems and methods for protecting video content described herein.

FIG. 5 is a flowchart for an exemplary process for separately processing data-hiding data in accordance with one or more embodiments of systems and methods for content-protecting video codecs described herein. Exemplary process 500 represents the operation of a Case 2 content-protecting video encoder, such as the exemplary encoder shown in FIG. 4B. However, one of ordinary skill in the art would recognize process 500 may be adapted to the a Case 1 content-protecting video encoder, such as the exemplary encoder shown in FIG. 4A as described in Formula (4), or any other content-protecting video encoder described herein, without departing from the spirit or the scope of the invention. Process 500 begins at step 502.

Processing continues to step 504, where a video frame is obtained. The video frame may be from a series of frames comprising video data. Although process 500 is presented with respect to video frames, one or more steps of process 500 may be effected using portions of a frame, channels of a frame, groups of frames, any image or image series, or in ways that vary from one fetch to another, without departing from the spirit or the scope of the invention.

Processing continues to step 506, where the video frame is stored as image $P_0$. Image $P_0$ may be stored in working memory. Image $P_0$ is treated as a wavelet space preview. Frame header data and other associated frame data may be stored and/or processed with image $P_0$ or separately. In one or more embodiments, one or more of the frame header data and/or associated frame data is treated as data to be hidden.

Processing continues to step 508, where variable i is set to 0. Variable i is configured to iterate through k. A suitable value for k may be selected or preset, indicating the number of times a wavelet transform will be iterated. In general, the larger the value of variable k, the greater the amount of processing will occur, and the smaller the amount of data required to be hidden for the video encoder to protect video content effectively. The value of variable k may be constant or may vary from frame to frame, from group of frames to group of frames, or in other ways. In one or more embodiments, the value of k may be 0 for one or more video frames in a set of video data. In this case, the wavelet transform will not be performed on every frame of the video data but may be performed on a subset of video frames in the set of video data.

Processing continues to decision step 510, where it is determined if i<k. If i<k, processing continues to step 512. Otherwise, processing continues to step 522.

Returning to optional step 512, image $P_i$ is pre-processed. In one or more embodiments, one or more algorithms, filters, and other encoder processes may be applied to $P_0$ prior to the initial application of the wavelet transform. For each iteration of variable i, various pre-processing algorithms, filters, and other processes, may be modified or held constant.

Processing continues to step 514, where a wavelet transform is applied to image $P_i$. In exemplary process 500, the wavelet transform applied may be one of Daubechies wavelet transforms that, when iterated, generates the pyramidal structure of FIG. 2A. Each iteration re-represents the preview of the previous iteration as a quarter-size preview, together with three quarter-size support spaces, referred to collectively as the support space for that level. Thus, the application of the wavelet transform to $P_i$ produces a quarter size preview $P_{i+1}$, and three quarter-size support spaces constituting support space $S_{i+1}$.

Processing continues to step 516, where a preview image $P_{i+1}$ is generated along with an associated support space $S_{i+1}$.

Processing continues to optional step 518, where support space $S_{i+1}$ is processed. In one or more embodiments, one or more pre-processing algorithms, filters, and other processes may be applied to the newly generated support space $S_{i+1}$.

Processing continues to step 518, where variable i is incremented.

Processing returns to decision step 510.

If the condition i<k is not met in step 510, processing continues to step 522, where dataset A is extracted from image $P_k$. Dataset A is chosen so as to guarantee that reconstruction of any suitable depiction of the original frame from the remaining data, including that of the processed support spaces from iteration 1 through k, is impossible or impractical. Depending on the value of k, the various processes that have been applied to previews and support spaces, and other data, the amount of data present in dataset A may constitute less than one-twentieth of one percent that of the original frame.

Processing continues to step 524, where relabeling and compression operations are applied to dataset A. To encode the video frame data, the data is relabeled to facilitate maximum lossless data compression.

Processing continues to step 526, where relabeling and compression operations are applied to the remaining data in image $P_k$ (i.e., dataset B). To encode the video frame data, the data is relabeled to facilitate lossless data compression.

Processing continues to step 528, where data-hiding techniques are applied to re-encoded and compressed dataset A. Data generated from relabeling and compressing the data of dataset A is subjected to one or more data-hiding processes to produce data-hiding dataset A'. In principle, almost any computationally based, reversible data-hiding technique is suitable, including that of AES-256 encryption. The data-hiding technique may vary between video frames, or may remain constant.

Dataset A' and dataset B may be may be merged into a single dataset or data stream and comprise the encoder output, or they may be presented separately, or they may be presented in any other form that allows a decoder to extract the data. Other alternatives include keeping the two kinds of data temporally separate, interleaving the data reversibly, streaming them on separate channels, or by any other method that permits dataset A to be later extracted.

Processing continues to decision step 530, where it is determined if more video frames remain to be processed. If more video frames remain to be processed, processing continues to step 504.

Otherwise, processing continues to step 532, where process 500 terminates.

Figure 6:
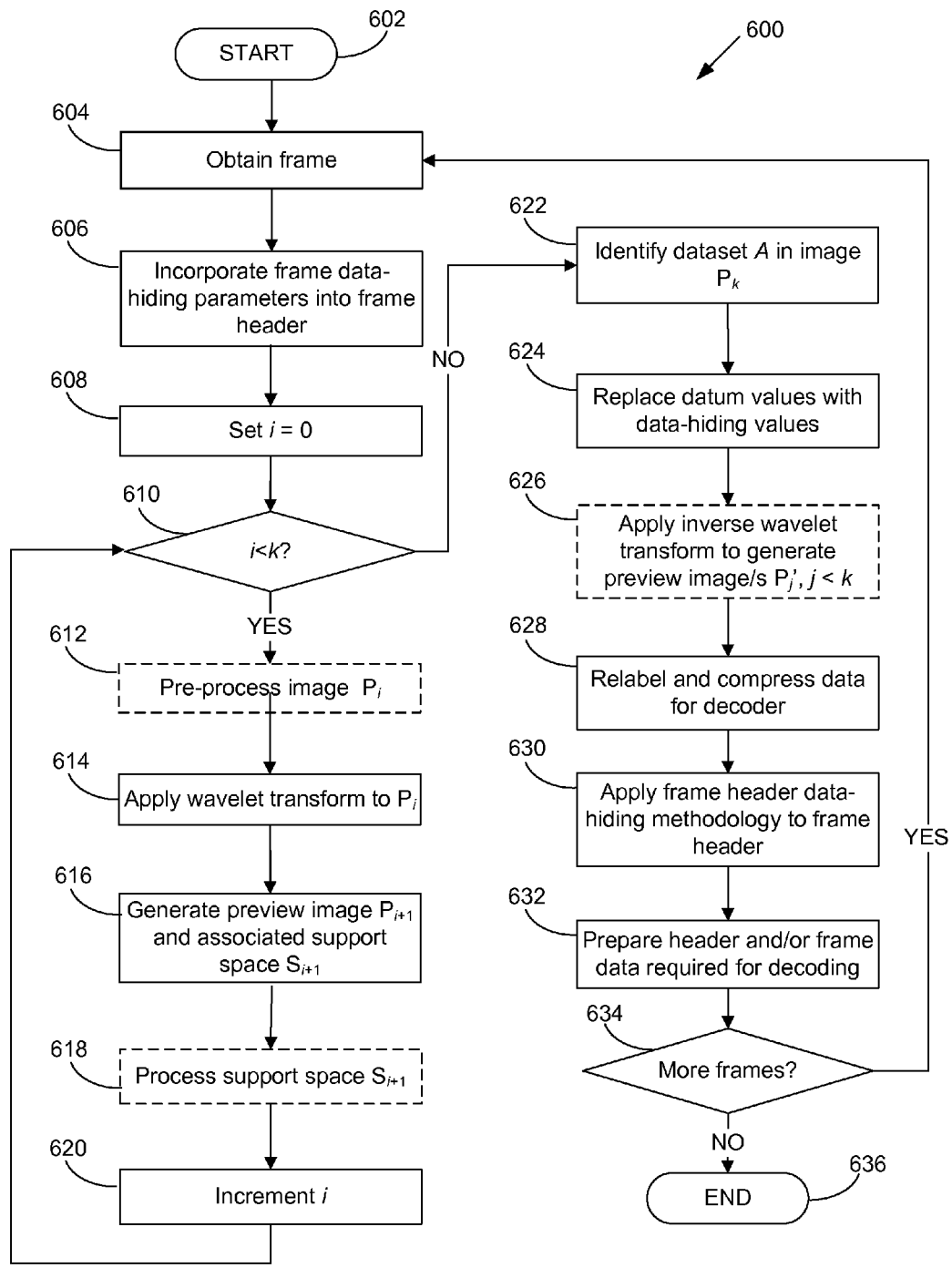
FIG. 6 is a flowchart for an exemplary process for video encoding in accordance with one or more embodiments of systems and methods for protecting video content described herein.

FIG. 6 is a flowchart for an exemplary process for video encoding in accordance with one or more embodiments of systems and methods for content-protecting video codecs described herein.

Process 600 begins at step 602.

Processing continues to step 604, where a video frame is obtained. Although process 600 is presented with respect to video frames, one or more steps of process 600 may be effected using portions of a frame, channels of a frame, groups of frames, any image or image series, or in ways that vary from one fetch to another without departing from the spirit or the scope of the invention. The video frame may be stored as image $P_0$, i.e., a wavelet space preview.

Processing continues to step 606, where frame data-hiding parameters are incorporated into the video frame header. The frame header may be constructed or modified. In addition to conventional frame header data, the frame header may include one or more data-hiding parameters that later contribute to the process of selecting particular combinations of data-hiding methods to be applied to this frame and serve to identify EDC dataset A data to be hidden.

Processing continues to step 608, where variable i is set to 0. Variable i is configured to iterate through k. A suitable value for k may be selected or preset, indicating the number of times a wavelet transform will be iterated. In general, the larger the value of variable k, the greater the amount of processing that will occur and the smaller the amount of data required to be hidden for the video encoder to protect video content effectively. The value of variable k may be constant or may vary from frame to frame, from group of frames to group of frames, or in other ways. In one or more embodiments, the value of k may be 0 for one or more video frames in a set of video data. In this case, the wavelet transform will not be performed on every frame of the video data, but may be performed on a subset of video frames in the set of video data.

Processing continues to decision step 610, where it is determined if i<k. If i<k, processing continues to step 612. Otherwise, processing continues to step 622. Returning to optional step 512, image $P_i$ is pre-processed. In one or more embodiments, one or more algorithms, filters, and other encoder processes may be applied to $P_0$ prior to the initial application of the wavelet transform. For each iteration of variable i, various pre-processing algorithms, filters, and other processes, may be modified or held constant.

Processing continues to step 614, where a wavelet transform is applied to image $P_i$. In exemplary process 600, the wavelet transform applied may be one of Daubechies wavelet transforms that, when iterated, generates the pyramidal structure of FIG. 2A. Each iteration re-represents the preview of the previous iteration as a quarter-size preview, together with three quarter-size support spaces, referred to collectively as the support space for that level. Thus, the application of the wavelet transform to $P_i$ produces a quarter size preview $P_{i+1}$, and three quarter-size support spaces constituting support space $S_{i+1}$.

Processing continues to step 616, where a preview image $P_{i+1}$ is generated along with an associated support space $S_{i+1}$.

Processing continues to optional step 618, where support space $S_{i+1}$ is processed. In one or more embodiments, one or more pre-processing algorithms, filters, and other processes may be applied to the newly generated support space $S_i$.

Processing continues to step 620, where variable i is incremented.

Processing continues to decision step 610, where it is determined if i<k. A k-level wavelet pyramid (see FIG. 2A) may be stored in memory, including possibly modified preview $P_k$ and possibly modified support spaces $S_1$ through $S_k$. If i<k, processing continues to step 604.

If the condition i<k is not met in step 610, processing continues to step 622, where dataset A is identified in image $P_k$. In one or more embodiments, frame header parameters inserted into the frame header at step 606 are accessed. These parameters may assist in selecting EDC dataset A and/or its location in preview $P_k$.

Processing continues to step 624, where datum values are replaced with a data-hiding value. In one or more embodiments, each datum that is a member of dataset A represents data that is to be hidden during this step. Each value to be hidden may be subjected to the data-hiding methodologies that may be determined in part by the contents of frame header, external inputs, and/or settings. In one or more embodiments, data-hiding values replace the value of the original datum at its original locale, leaving the data structure unchanged. These substitutions result in a modified preview $P_k'$. If inverse wavelet transforms are applied to $P_k'$ together with $S_1, \ldots, S_k$, the resulting image $P_0'$ would bear little resemblance to $P_0$. Generally, the larger the value of k, the less resemblance there is between $P_0'$ and $P_0$, effectively protecting the original video content $P_0$ from copying or reconstruction.

Processing continues to optional step 626, where an inverse wavelet transform (IWT) is applied to generate at least one preview image $P_j'$, where j is less than k. In one or more embodiments, the IWT may be applied from zero to k−1 times. If the selected value of j is k, then optional step 626 is effectively skipped, and data from the entire k-level wavelet pyramid, support data $S_1, \ldots, S_k$ and corrupted preview $P_k'$, may be considered for step 628. A content-protecting video codec may also be based on any selection of integer j, k>j≥0. For example, if j=0 is selected, then the inverse wavelet transformation is applied k times and produces $P_0'$, which has little resemblance to the original frame image $P_0$. If any other value of j is selected, the data later transmitted or stored would be from support data $S_1, \ldots, S_j$ and corrupted preview $P_j'$. Interception of this data would at best permit construction of the same $P_0'$, again protecting original frame content $P_0$. Step 626 allows a conditional trade-off between minimizing encoding and decoding processing time and minimizing video bit rates and file sizes.

Processing continues to step 628, where relabeling and compression operations are applied. Data representing data-hiding preview $P_j'$ and support spaces $S_1, \ldots, S_j$ data are relabeled to facilitate lossless compression and then compressed.

Processing continues to step 630, where frame header data-hiding methodology is applied to the frame header.

Processing continues to step 632, where the frame header and/or frame data required for decoding is prepared. Partially hidden frame header data and frame data may be prepared for transmission and/or storage for later decoding.

Processing continues to decision step 634, where it is determined if more video frames remain to be processed. If more video frames remain to be processed, processing continues to step 604.

Otherwise, processing continues to step 636, where process 600 terminates.

Process 600 may accommodate: any wavelet-based or other multiresolution-based system; any data-hiding methodology, sequence of methodologies, or combination of methodologies; any positive number of transform iterations before selecting data to be hidden during the encoding process; any number of iterations transforms or inverses transforms before final compression; any lossless method for data relabeling before final compression; and/or any means or criteria for selecting data to be hidden or the location of data to be hidden. Data-hiding keys may depend on any logical combination of correct passwords and other conditions that must satisfied.

Figure 7:
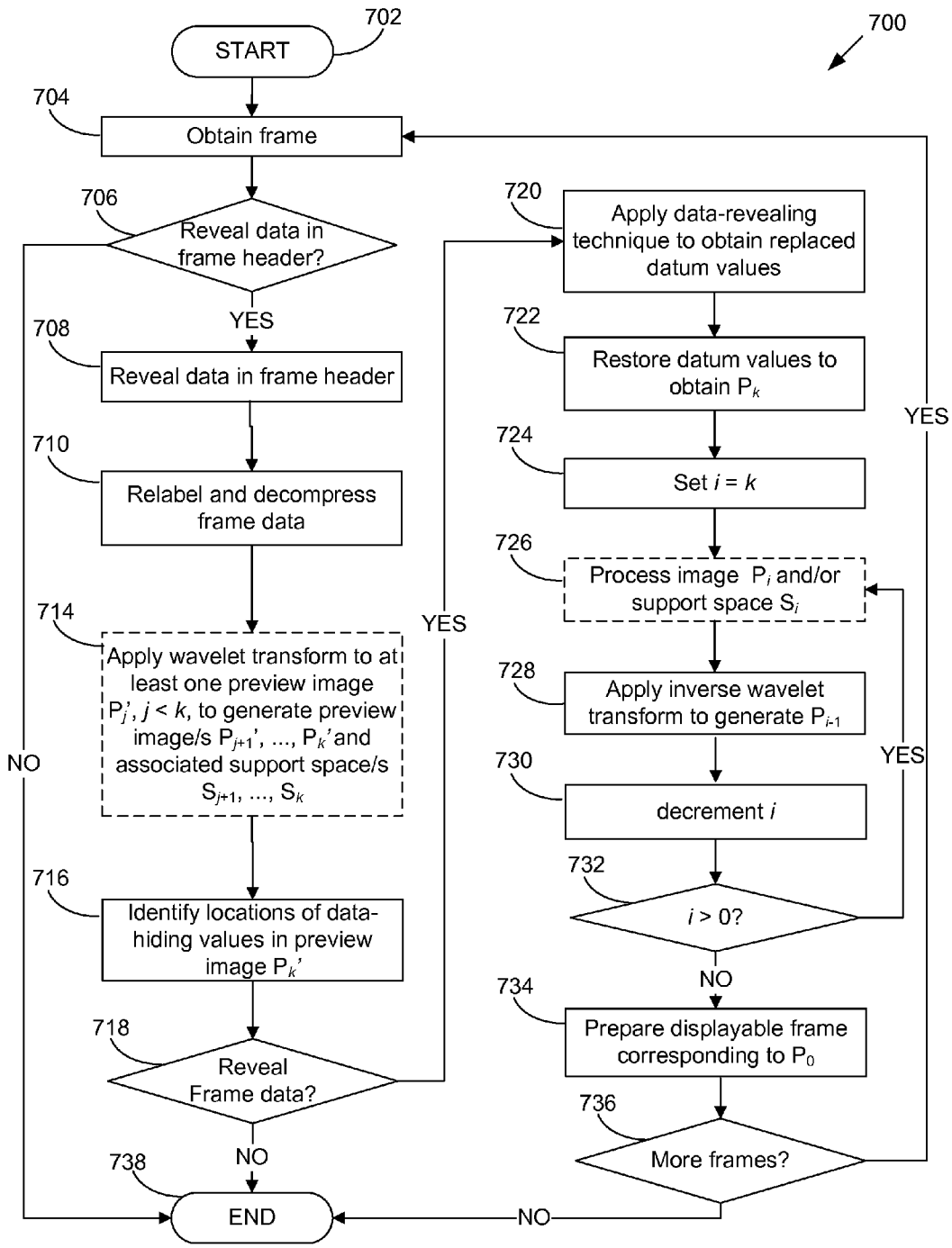
FIG. 7 is a flowchart for an exemplary process for video decoding in accordance with one or more embodiments of systems and methods for protecting video content described herein.

FIG. 7 is a flowchart for an exemplary process for video decoding in accordance with one or more embodiments of systems and methods for content-protecting video codecs described herein. Process 700 begins at step 702.

Processing continues to step 704, where a video frame is obtained. Although process 500 is presented with respect to video frames, one or more steps of process 500 may be effected using portions of a frame, channels of a frame, groups of frames, any image or image series, or in ways that vary from one fetch to another without departing from the spirit or the scope of the invention.

Processing continues to decision step 706, where a decision is made as to whether hidden frame header data is to be revealed. If frame header key conditions are not met, then processing continues to step 738 where process 700 terminates, possibly with an appropriate error message.

If frame header key conditions are satisfied, then processing continues to step 708, where frame header data is revealed and made available for later processes.

Processing continues to step 710, where frame data is decompressed and relabeled. In one or more embodiments, decompression and relabeling yields modified preview $P_j'$ and support spaces $S_1, \ldots, S_j$.

Processing continues to optional step 714, where a wavelet transform is applied to modified preview $P_j'$ and its support space one or more times until $P_k'$ is produced. At that point, modified preview $P_k'$ is available and data from support spaces $S_1, \ldots, S_k$ may be available. Unavailable support space data may be assumed to be zero or otherwise replaced. In one or more embodiments, the wavelet transform may be applied from zero to k−1 times. If the selected value of j is k, then optional step 714 is effectively skipped.

Processing continues to step 716, where locations of data-hiding values in preview image $P_k'$ are identified.

Processing continues to decision step 718. If key conditions are not satisfied for unlocking hidden frame data, then processing continues to Step 738 and stops, possibly with an appropriate error message.

Otherwise, processing continues to step 720, where one or more data revealing techniques are applied to obtain replaced datum values. In one or more embodiments, frame header data is used to determine the location of data-hiding data in modified preview $P_k'$. For each data-hiding datum w in $P_k'$, data-revealing processes may be applied to obtain the value of datum v in the location in $P_k$ corresponding to the location of w in $P_k'$.

Processing continues to step 722, where hidden frame data is restored. When this process is complete, an EDC dataset A″ has been restored from dataset A′ and original preview $P_k$ is now available.

Processing continues to step 724, where variable i is set to k.

Processing continues to optional step 726, where image $P_i$ is pre-processed. In one or more embodiments, support $S_i$ is also pre-processed. One or more algorithms, filters, and other encoder processes may be applied. For each iteration of variable i, various pre-processing algorithms, filter, and other processes, may be modified or held constant.

Processing continues to step 728, where an inverse wavelet transform is applied to preview $P_i$ and support space $S_i$ to obtain preview $P_{i-1}$.

Processing continues to step 730, where i is decremented.

Processing continues to decision step 732, where it is determined if variable i>0. If variable i>0, processing continues to step 726.

Otherwise, processing continues to step 734, where a displayable frame corresponding to $P_0$ is prepared. For example, the displayable frame may be a suitable approximation of an original video frame image $P_0$. In one or more embodiments, the displayable frame is prepared for display and sent to the display system.

Processing continues to decision step 736, where it is determined if more video frames remain to be processed. If more video frames remain to be processed, processing continues to step 704.

Otherwise, processing continues to step 738, where process 700 terminates.

Process 700 may accommodate: any wavelet-based or other multiresolution-based system; any data-hiding methodology, sequence of methodologies, or combination of methodologies; any positive number of transform iterations before selecting data to be hidden during the encoding process; any number of iterations transforms or inverses transforms before final compression; any lossless method for data relabeling before final compression; and/or any means or criteria for selecting data to be hidden or the location of data to be hidden. Data-hiding keys may depend on any logical combination of correct passwords and other conditions that must satisfied.

The architecture of one or more content-protecting codecs including encoder and decoder may be represented by the diagram of Formula (3), reproduced below.

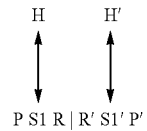

Separator subsystem S1 and combining subsystem S1′ in the architecture of Formula (3) are described by the Case 1 descriptions of subsystems S and S′. In Case 1, data-hiding data replaces data to be hidden by direct in situ substitution of data-hiding data for data to be hidden. Case 1 usage conveniently and economically retains preview frame data structure and facilitates single stream encoding and decoding.

In contrast, separator and combining subsystems S2 and S2′ in the architectures of Formulas (4)-(10), are described in the description of Case 2 subsystems S2 and S2′. Dummy data may be substituted in situ for dataset A data, but data-hiding dataset A′ may be processed separately from other data. This separate processing stream is reflected in Formulas (4)-(10). FIGS. 4B and 5 illustrate Case 2 architectures.

EXAMPLES

The general methodology described above, further suggested by the many architectural alternatives, points the way to developing similar content-protecting video codecs from existing video codecs, including non-wavelet based video codecs. A method is now described for extending other video codec to effective content-protecting video codecs without adding excessive processing load to the decoder.

Converting Non-Wavelet-Based Video Codecs to Practical, Effective Content-Protecting Video Codecs Let C be a video codec, with video encoder C-E and video decoder C-D. As usual, video V may be processed and compressed by encoder C-E and output as a data stream that is transmitted and/or stored and finally retrieved and input to decoder C-D, where it is decompressed and decoded into a displayable reproduction of video V.

Three specific exemplary methods for converting video encoder C-E to a content-protecting encoder CP-E are now summarized. These three methods are video multi-codec encoders as described in U.S. patent application Ser. No. 13/275,292.

Each of these methods starts with one or more applications of a wavelet transform, as flowcharted in Step 508 or Step 610. Two of these methods use Case 2 subsystems S2, in which special unrelated data is substituted for dataset A data in preview $P_k$ as may occur in Steps 510 to 516. The third method uses a Case 1 subsystem S1, which substitutes data-hiding dataset A' data in situ in preview $P_k$, as occurs in Step 624.

Example 1

The Case 2 examples differ in what happens after preview $P_k$ is modified by the substitution of unrelated data for dataset A. Let $P_k'$ be the array that results after unrelated data is substituted for dataset A in preview $P_k$. In Example 1, the projection FIG. 2A of the entire wavelet pyramid $P_k'$ together with support spaces $S_1, \ldots, S_k$ of FIG. 2B is treated as an image and input as a video frame to encoder C-E. When a decoder C-D for an Example 1 encoder reconstructs this wavelet pyramid image and reveals dataset A data, it replaces appropriately located data in reconstructed $P_k'$ with dataset A data. The IWT is applied k times to the resulting wavelet pyramid to reconstruct a semblance of original frame image $P_0$.

Example 2

In Example 2 care must be taken that the unrelated data substituted for dataset A be data that is neutral with respect to the pointwise addition operation later applied. (For color spaces used in popular codecs, this value may be zero, representing the absence of color. In that case, zeros would be substituted in situ for all dataset A data.) Later, instead of inputting as an image two-dimensional wavelet pyramid $P_k'$ with support spaces $S_1, \ldots, S_k$ to encoder C-E, the IWT is first applied k times to this wavelet pyramid image. This process produces an image $P_0'$ that is generally unrecognizable. Image $P_0'$ is input to encoder C-E. Image $P_0'$ is encoded, transmitted and/or stored, and eventually decoded by decoder C-D. Data-hiding dataset A', which has been separately processed and decoded, is processed in decoder C-D to reveal dataset A. A Level k preview $Q_k$ is constructed from dataset A by placing dataset A data in its original positions in an otherwise all-zeros array of the same dimensions as preview $P_k$. A two-dimensional wavelet pyramid is constructed from $Q_k$ together with all-zeros support spaces $Z_1, \ldots, Z_k$. An IWT is applied k times to obtain full frame-resolution image $Q_0$. Semblance P' of original frame $P_0$ is obtained from the pointwise addition of image $Q_0$ to $P_0'$.

Example 3

Case 1 Example 3, like Example 1, is distinguished by what happens next to $P_k'$, defined as preview $P_k$ modified by the substitution in situ of hiding dataset A' data for dataset A data. Example 3 is an example of a Case 1 subsystem S1 in which $P_k'$ is obtained by replacing dataset A' data in situ with dataset A data in preview $P_k$. Entire two-dimensional wavelet pyramid $P_k'$ together with support spaces $S_1, \ldots, S_k$, is treated as an image and input as a video frame to encoder C-E. After a decoder C-D for Example 3 reconstructs this wavelet pyramid image, dataset A' data in $P_k'$ is replaced with dataset A data. The IWT is applied k times to the resulting wavelet pyramid to reconstruct a semblance of original frame $P_0$.

In Examples 1, 2, and 3, each frame is processed first by subsystems of a wavelet-based content-protecting encoder W-E like those of FIGS. 5 and 6. Data from each processed frame is later passed to encoder C-E for final processing and compression. Then the interacting system described in each example is a content-protecting encoder CP-E consisting of the subsystems of codec W and encoder C-E.

As defined in U.S. patent application Ser. No. 13/275,292, a video multi-codec encoder is a system that can be configured to encode each of one or more video frames using subsystems of at least two different video codecs. By this definition, each content-protecting encoder CP-E described in Examples 1, 2, and 3 is a video multi-codec encoder, with C-E the output encoder and codec W the supporting codec.

The architecture of Examples 1 and 2 may be represented as a simplified instance of Formula (5), repeated here:

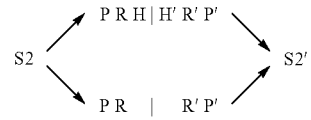

Inasmuch as there is no reference to processing or relabeling of data prior to data-hiding operations of subsystem H in either example, the diagram of Formula (5) describing the architecture of Examples 1 and 2 may be simplified to Formula (11):

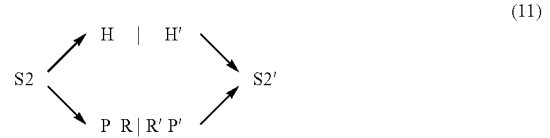

(11)

In Examples 1 and 2, the processes of subsystem S2 prior to data separation include one or more applications of the WT of codec W. Especially for Example 2 architectures, for some video codecs C, the processes of C-E represented by subsystem P may not operate as effectively on the degraded frame image that encoder C-E receives from subsystem S2. For these video codecs, this problem may be ameliorated by performing some C-E processing prior to the application of a WT or at least before data substitution in $P_k$. The resulting architecture may be most generally represented as in Formula (12), where processes of subsystem P are divided between subsystems $P_1$ and $P_2$, one of which may be vacuous.

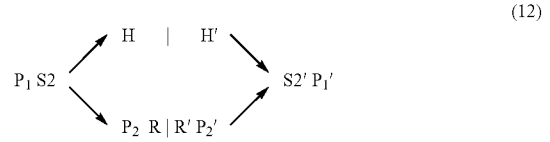

(12)

This architecture is advantageous, for example, if encoder C-E is an encoder that dices a frame before converting it into a bit stream (as occurs in MPEG-4, H.264, and HEVC codecs, for example). Codec W operations may be applied immediately before the partially processed frame is diced. This architecture allows for further C-E processing $P_2$ to occur after this dicing or conversion.

As described, Example 3 suggests the Case 1 architecture of Formula (3):

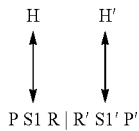

For some codecs C, it may be advantageous for some C-E processes to precede the separation and substitution operations of subsystems S1 and H. The resulting architecture is reminiscent of Formula (12).

Formula (13) is presented:

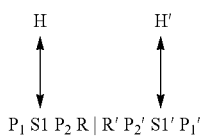 (13)

As Formula (13) suggests, the input video frame is first subjected to some processing $P_1$ usual to unenhanced encoder C-E. In a multi-codec encoder like those of Example 3, subsystem S1 includes some wavelet-based processing prior to data separation and substitution. Dataset A is removed from the partially processed frame, and hiding data is produced by subsystem H. Hiding data replaces dataset A data in the partially processed frame. Subsystem $P_2$ of unenhanced encoder C-E completes the processing of the modified partially processed frame. Frame data is then relabeled and compressed for transmission or storage. Thus, the operation of unenhanced codec C alone would be Formula (14):

$$P_1 P_2 R | R' P_2' P_1' \qquad (14)$$

Inserting the operations S→H→S and S'→H'→S' into Formula (14) enhances codec C to become the content-protecting codec CP illustrated in Formula (13).

One last variation of the content-protecting codec enhancement process is now described. This variation is not restricted to the use of multiresolution-based operations as part of the content-protecting encoding process. Observe that the architecture of Formula (13) may be used without wavelet-based operations as part of any component. Data essential to recovery of the data structure expected by subsystem $P_1'$ is part of an EDC dataset A. For this purpose, dataset A may be very small, small enough to include dataset A within the frame header. If that is the case, then only a subset of frame header data, enhanced to include dataset A, need be hidden. The means of locating this data may be known in advance, enabling subsystem S1 to identify this data and subsystem H to hide dataset A data. For example, the positions EDC dataset A in one frame header may be obtained from data originally placed in earlier frame headers and then hidden. These variations in creating a content-protecting codec have the advantage of imposing a very little encoding and decoding processing load on the codec and yet retain the advantage that deletion of frame headers makes video copying useless and decoding impractical or impossible.

One or another variation in the above methods and architectures may be useful for some video codecs in order to improve reproduction quality, system efficiency, or other performance features. These fundamental enhancement methodologies can extend video codecs to practical, effective content-protecting video codecs.

Content Security for any Hardware, Firmware, or Software-Implemented Video Codec System Video encoders and decoders may be implemented in one or more combinations of ways. Either encoder or decoder may be implemented as software running on a computer, whether a personal computer, an embedded system, a mainframe, a server, a distributed processing system, the cloud, or any other software processing system. Either encoder or decoder may be implemented as special-purpose processing hardware: a chip, family of chips, circuit board, embedded processor, FPGA, application specific integrated circuit, set top box, or any other processing hardware device or system. Either encoder or decoder may be implemented partially or completely as firmware or multi-purpose hardware whether tailored temporarily or permanently. Any such implementation of a video codec can be expanded to that of a content-protecting video codec by applying one or more of the techniques described or suggested above.

For example, consider a USB drive, sometimes referred to as 'flash memory' or 'thumb drive'. Such devices are sometimes used to store a complete encoded video as a file. If the corresponding video decoder is also stored on the USB drive, the encoded video can be decoded and played on any external device capable of either uploading the decoder and then decoding the encoded video contents of the USB drive, or by uploading the decoded video as video frames are made available by the internal operations of the USB drive. If the external device includes a video display or drives a video display, then the video can be displayed as it is decoded.

Now suppose that the video codec is a content-protecting video codec. Then the encoded video stored on the USB device cannot be decoded without the use of the corresponding content-protecting video decoder. Furthermore, some mechanism is necessary for enabling the video decoder to reveal the data hidden during the encoding process. Ordinarily, some key, password, or other data or process (collectively referred to here as 'key') must be made available to the USB drive or the device receiving data from the USB drive in order to enable hidden data to be revealed and the video to be suitably reproduced.

This key may depend on any one or combination of the following: the video; the video content owner; the provider of the video; one or more users; an instance of the encoder; the encoding system; a password provided by the user or someone else; a time of encoding; a storage device, storage device identifier, storage device configuration, or any other device characteristic; acceptable processing devices; acceptable display systems; DRM-generated provisos; membership in a set of allowable viewers; geographical location; any other set of suitable conditions.

For example, the content protection system may be designed to allow the use of the correct password to play only the specific video from a specific USB drive on a specific computer for a specifically limited length of time, in a specific region, and only a certain number of times. Similarly, the password may allow only a prespecified set of users to play copies of the content-protected encoded video. Even if the content protected video is copied, the copy may be unplayable if, for example, it is copied to a different USB drive or other memory device. In other words, video content is protected from usable proliferation.

Content Security for any Video Storage System.

Any memory device with sufficient capacity can be used as an effective, self-contained content-protecting video storage system. If a suitable processing capability is included in a system containing such a memory device, the system may be configurable as a self-contained content-protecting video storage and player. These ideas are exemplified in FIGS. 8A-8C.

Figure 8A:
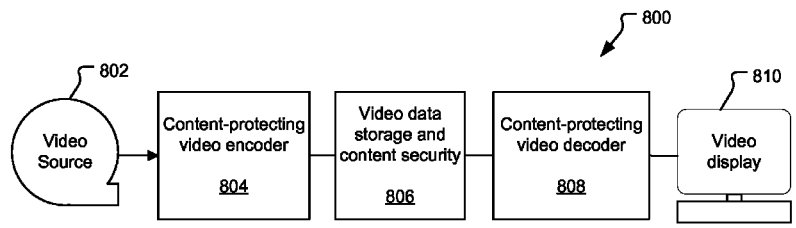
FIGS. 8A, 8B, and 8C present three distinct but related architectures involving video content-protected storage in accordance with one or more embodiments of systems and methods of the present invention.

FIG. 8A illustrates a video storage system with content security using a content-protecting video codec system in accordance with one or more embodiments of systems and methods for content-protecting video codecs described herein. Content-protecting video storage system diagram 800 includes video source 802, content-protecting video encoder 804, video data storage with content security 806, content-protecting video decoder 808, and video display 810.

Content-protecting video data storage with content-security is enabled by passing the video file to be protected from video source 802 through external content-protecting video encoder 804. Content-protecting video encoder 804 may include information about the target storage facility and/or any other password or key conditions during the encoding process. Content-protecting video encoder sends encoded video data to video data storage with content security system 806. Unless provided with appropriate key information, stored video data cannot be accessed and suitably decoded. If provided with appropriate key information, stored video data is accessed from video data storage with content security system 806 and decoded by content-protecting video decoder 808, for display by video display 810.

In one or more embodiments, video data storage with content security 806 may protect its video data contents from copying unless provided appropriate key information. In one or more embodiments, video data storage with content security 806 is the only source for the video data it contains from which the video data may be suitably decoded. In this case, copies of video data stored in video data storage with content security system 806 cannot be suitably decoded by any decoder, including content-protecting video decoder 808.

Figure 8B:
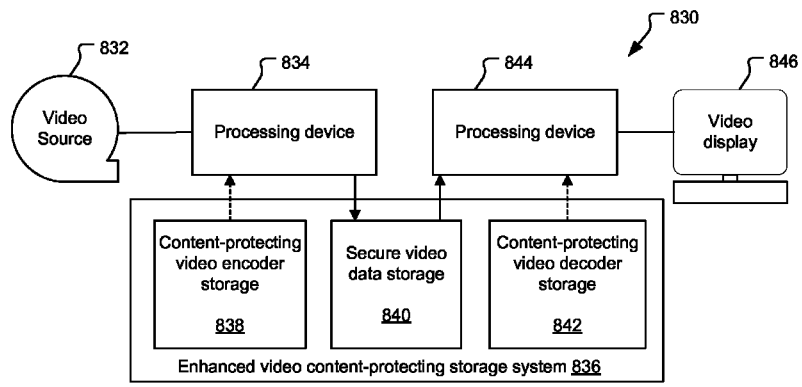

FIG. 8B illustrates a video content-protection storage system that facilitates content-protected video storage and playback by including in memory, whether software, firmware, or hardware, a content-protecting video encoder and a content-protecting video decoder as well as sufficient storage capacity to store a compressed video file.

Enhanced video content-protection system diagram 830 includes video source 832, processing device 834, which is able to implement content-protecting video encoding, enhanced content-protecting video encoder storage system 836, processing device 844, which is able to implement content-protecting video decoding, and video display 846. Enhanced video content-protection storage system 836 includes content-protecting video encoder storage 838, secure video data storage 840, and content-protecting video decoder storage 842. Storage allocation of these blocks of storage may be physically separated, virtual, or integrated in any way. Enhanced video content-protection storage system 836 may include or be integrated with unsecure video data storage or any other storage.

In order to take unprotected video content and store it as content-protected video in enhanced video content-protection storage system 836, the content-protecting video encoder is first retrieved from content-protecting video encoder storage 838 and placed on processing device 834. This retrieval process may be conditioned on a suitable password and/or other key conditions. The video or videos to be protected are then encoded and protected with the help of processing device 834. The encoded and protected video is stored in secure video data storage 840. In order to generate displayable video from enhanced video content-protection storage system 836, the content-protecting video decoder is first retrieved from content-protecting video decoder storage 842 and placed on a processing device 844. This retrieval process may be conditioned upon a suitable password and/or other key conditions. The video to be displayed may then retrieved from video content-protection system 836 and processed by processing device 844 for display, provided password and/or other key conditions are satisfied.

In one or more embodiments an external content-protecting video encoder or content-protecting video decoder is available. In this case, either content-protecting video encoder storage 838 or content-protecting video decoder storage 842 may be omitted from enhanced video content-protection storage system 836.

Figure 8C:
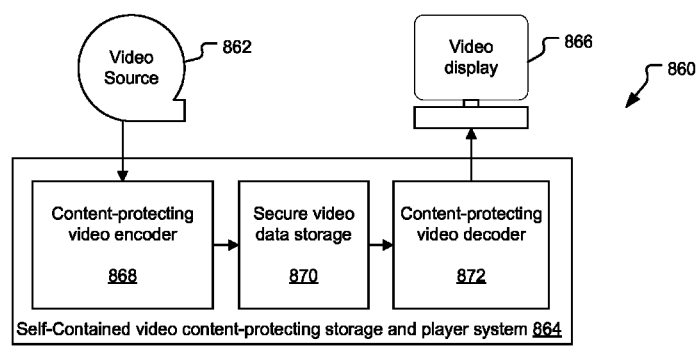

FIG. 8C illustrates a self-contained content-protecting video storage and player. Self-contained content-protecting video storage and player system diagram 860 includes video source 862, self-contained video content-protecting storage and player system 864, and video display 866. Self-contained video content-protecting storage and player system 864 stores content-protecting video encoder 868 and corresponding content-protecting video decoder 872, and is capable of additionally storing one or more videos in secure video data storage 870. Content-protecting video encoder 868 and content-protecting video decoder 872 may be in the form of software, firmware, special purpose computer processors, FPGAs, ASICs, or any other suitable software/hardware means of performing video encoding and/or decoding functions.

Self-contained content-protecting video storage and player system 864 operates in two modes: record and playback. In record mode, self-contained content-protecting video storage and player system 864 accepts, protects, and stores video from an external source. In playback mode, self-contained content-protecting video storage and player system 864 decodes protected video and outputs the video for display. Record and playback modes are now described in detail.

In record mode, video source 862 outputs unprotected video data to self-contained content-protecting video storage and player system 864. Content-protecting video encoder 868 accepts unprotected video data and may modify its encoding process in accord with provided passwords or other key conditions to produce secure encoded video data. Self-contained content-protecting video storage and player system 864 then conveys encoded secure video data to secure video data storage 870. Secure video data remains in storage until password and/or other key conditions are satisfied for releasing the stored video. At that point, self-contained content-protecting video storage and player system 864 switches to playback mode with respect to that video.

In playback mode, self-contained content-protecting video storage and player system 864 retrieves secure video data from secure video data storage 870 and conveys it to content-protecting video decoder 872. Content-protecting video decoder 872 processes and decodes secure video data and outputs video for display. Self-contained content-protecting video storage and player system 864 conveys decoded displayable video from content-protecting video decoder 872 to self-contained content-protecting video storage and player system 864 output.

FIGS. 8A, 8B, and 8C present three distinct but related architectures involving video content-protected storage. For simplicity, for each figure the architecture of the encoding and decoding side of the figure are presented as corresponding closely with one another. However, any suitable architecture for the encoding side can be combined with any suitable architecture of the decoding side to create a suitable architecture for a video content-protecting storage system. Also, in one or more embodiments, the function of content-protecting video storage may be distributed over any number of physically distinct devices, as may occur in a BitTorrent-style system, for example.

Real-Time Production of Effectively Protected Video Content.

Real-time encoding of standard and high resolution video content is both commercially important and technically challenging. Adding any but the most superficial content protection mechanisms to this process has been difficult because effective content protection methodologies typically multiply encoding time. For this reason, commercially valuable content that must be distributed at video speed is distributed with superficial, easily defeated content protection or none at all. Content-protecting video codecs provide a practical solution to this problem.

Let C represent a real time video codec with an encoder C-E that supports real time video encoding. If C is a wavelet-based video codec, then Steps 502 through 512 may suitably represent the video encoder C-E. Steps 514, 516, and 518 are all high speed operations that add little to the processing time of the encoder. Consequently, the content-protecting video encoder now represented by FIG. 5 is nearly as fast as encoder C-E—that is, it is almost certainly a real time content-protecting encoder. This system maintains high encoding efficiency because only a very small fraction of the video data must be hidden by slow, time-consuming encryption or other techniques.

Even if video encoder C-E is not wavelet-based, methods illustrated in FIG. 5 and methods like those of Examples 1 and 2 for extending codec C to a content-protecting codec CP may still result in a viable real-time content-protecting encoder CP-E. The processes added to encoder C-E to obtain encoder CP-E certainly add to the total processing load. However, parallel processing in a multi-core computer may support pipeline processing that adds harmlessly to latency without reducing video throughput. At worst, the amount of added processing is likely to be at most double that of encoder C-E and more likely a small fraction of that. The problem that usually makes strong content protection impractical, the extremely slow encryption process applied to huge amounts of data, is not an issue here because so little data actually requires protection.

Encrypted Bandwidth-Limited High Resolution Image Transmission.

Previous discussions and applications to video can be modified to refer to an individual image or picture. In other words, content-protecting image encoding, decoding, and codecs could as easily have been the focus of the previous discussion. Most applications of the described concepts and methods are of less interest with respect to imagery for various practical reasons. However, these methods are relevant to some image-related applications.

One application for which a single image may be extremely high resolution and therefore involve an extraordinarily large amount of data that must be transmitted across low bandwidth channels is that of extremely high resolution satellite imagery. In this application, content encryption may also be important, perhaps due to the commercial value of the content.

Conventional content protection of satellite imagery requires massive amounts of image data to be encrypted. While unencrypted image data is readily compressed to a very small fraction of its original file size, if the same data is first encrypted, very little compression is possible. The result is a huge multiplication of bandwidth loading, resulting in very long download times and consequent reduction of satellite bandwidth available for other purposes.

Much of today's satellite image transmission is wavelet based. For that reason, extending the satellite image encoder to that of FIG. 5 as applied to a single frame, results in a practical download system for fully content-protected imagery. The amount of bandwidth, encoding processing, encoding latency, decoding processing, and other data transmission and processing issues differ insignificantly from that of encoding and transmission of unprotected imagery.

Many similar advantages and savings apply to satellite video scenarios.

Non-Codec Applications of the Systems and Methods for Protecting Images and Low Frame-Rate Video Systems and methods for protecting video content are readily applicable to image processing, low frame-rate video processing systems, and low resolution video processing systems, whether or not video codecs are used for compression/decompression. The need for content security and/or privacy may be a high priority, as in low-frame-rate satellite video, low-frequency video surveillance systems, 3-D medical applications, for example. Other such applications, like very low-resolution full frame-rate video, video conferencing and signage transmission may require selective content protection because of their content without requiring sophisticated video compression. In these cases, a less complex video-to-data processor may replace a more sophisticated video encoder, and a corresponding data-to-video processor may replace a video decoder. The systems and methods for protecting video content described and illustrated in FIGS. 4-8 are readily tailored to these and other image and video processing systems by one skilled in both the art and the target application, whether or not video codecs are involved.

Device-Dependent Key Generation

Device-dependent key generation guarantees complete end-to-end video content protection. That is, from the moment video is encoded to the moment of its full display at full frame rate, the video content cannot be usefully copied. Even if a perfect copy were made of the entire contents of storage and retrieval system 806 and placed on another similar storage and retrieval system, this video data could not be used to provide a suitable reproduction of the original video. The key would fail because it works only on the original storage system.

The best a video pirate could do would be to intercept the video after video reconstruction. This could occur on the fly, immediately before, during, or after video display. Capturing full standard or high resolution video at full frame rate requires voluminous high speed storage or quality-degrading real time high compression video encoding.

While the invention herein disclosed has been described by means of specific embodiments and applications thereof, numerous modifications and variations could be made thereto by those skilled in the art without departing from the scope of the invention set forth in the claims.

What is claimed is:

1. A system for protecting video content comprising:
   computer memory comprising a stored set of instructions for processing video data; and
   at least one microprocessor configured to process the video data according to the stored set of instructions, the stored set of instructions configured to:
   receive encoded video data from a video source, said video data comprising at least one video frame;
   apply at least one wavelet transform to a selected frame of the at least one video frame k iterations to generate image data Pk and associated support spaces, where k is an integer greater than 1, wherein each of said iterations re-represents a preview of the previous iteration as a quarter-size preview, together with three quarter-size support spaces;

separate said image data Pk into dataset A and modified image Pk'; wherein reproduction of the selected frame of the at least one video frame requires said dataset A and said modified image data Pk';

re-encode and compress said dataset A of said image data Pk;

apply data-hiding operation to said re-encoded and compressed dataset A to generate a modified dataset A' such that dataset A requires a key for reconstruction from dataset A';

re-encode and compress said modified image Pk'; and output at least one video stream comprising a frame header, said modified dataset A' and said re-encoded and compressed modified image Pk'.

2. The system for protecting video content of claim 1, wherein the data-hiding operation comprises encryption.

3. The system for protecting video content of claim 1, wherein the data-hiding operation comprises replacing at least one datum value with data-hiding parameters, wherein at least a portion of the data-hiding parameters is stored in said header.

4. The system for protecting video content of claim 1, wherein the key is an encryption key.

5. The system for protecting video content of claim 1, wherein the key is device dependent.

6. The system for protecting video content of claim 1, wherein the key is dependent on at least one factor selected from a group comprising a video identifier, a video content owner, a video provider, one or more user identities, an encoder instance, an encoding system, a password, a time of encoding, a storage device, a storage device identifier, a storage device configuration, an authorized processing device, an authorized display system, a Digital Rights Management (DRM)-generated proviso, a membership status, or a geographical location.

7. The system for protecting video content of claim 1, wherein the output video stream is stored on a computer storage medium.

8. The system for protecting video content of claim 1, wherein the output video stream comprises satellite video transmission data.

9. The system for protecting video content of claim 1, wherein said set of instructions is further configured to encrypt and include said key in said frame header.

10. The system for protecting video content of claim 1, wherein the at least one wavelet transform is a Daubechies wavelet transform.

11. The system for protecting video content of claim 1, wherein said frame header includes a first portion of said key, and wherein a second portion of said key is required by a decoder for reproduction of said selected frame.

12. The system for protecting video content of claim 1, wherein the output video stream is readable by a video decoder configured to reproduce said selected frame from said output video stream using data from said frame header.

13. A method for protecting video content with a video encoder comprising:

a video encoder receiving encoded video data from a video source, said video data comprising at least one video frame;

said video encoder applying at least one wavelet transform to a selected frame of the at least one video frame k iterations to generate image data Pk and associated support spaces where k is an integer greater than 1, wherein each of said iteration re-represents a preview of the previous iteration as a quarter-size preview, together with three quarter-size support spaces;

said video encoder separating said image data Pk into dataset A and modified image Pk'; wherein reproduction of the selected frame of the at least one video frame requires said dataset A and said modified image data Pk';

said video encoder re-encoding and compressing said dataset A of said image data Pk;

said video encoder applying data-hiding operation to said re-encoded and compressed dataset A to generate a modified dataset A' such that dataset A requires a key for reconstruction from dataset A';

said video encoder re-encoding and compressing said modified image Pk'; and said video encoder outputting at least one video stream comprising a frame header, said modified dataset A' and said re-encoded and compressed modified image Pk'.

14. The method of claim 13, further comprising:
encrypting and including said key in said frame header.

15. The method of claim 14, wherein the output video stream is stored on a computer storage medium.

16. The method of claim 13, wherein said data-hiding operation comprises replacing at least one datum in said dataset A with data-hiding data, wherein at least some of the data-hiding data is stored in said header.

17. The method of claim 13, wherein said frame header includes a first portion of said key.

18. The method of claim 17, wherein a second portion of said key is required by a decoder for reproduction of said selected frame.

19. The method of claim 14, wherein an encryption key is required by a decoder for reproduction of said selected frame.

20. The method of claim 13, wherein the output video stream is distributed via satellite video transmission.

21. The method of claim 13, wherein the key is device dependent.

22. The method of claim 13, wherein the key is dependent on at least one factor selected from a group comprising a video identifier, a video content owner, a video provider, one or more user identities, an encoder instance, an encoding system, a password, a time of encoding, a storage device, a storage device identifier, a storage device configuration, an authorized processing device, an authorized display system, a Digital Rights Management DRM)-generated proviso, a membership status, and a geographical location.

23. The method of claim 13, wherein said data-hiding operation comprises encryption.

24. The method of claim 13, wherein said output video stream is readable by a video decoder configured to reproduce said selected frame from said output video stream using data from said frame header.

25. A video decoder system for protected video content comprising:

computer memory comprising a stored set of instructions for processing a content protected frame of video data; and a processor configured to process the content protected frame of video data according to the stored set of instructions, the stored set of instructions configured to:

obtain said content protected frame of video data comprising a frame header, a dataset A' and image data Pk', wherein said frame header includes information comprising a key, locations of dataset A' in image data Pk', the method of data hiding used, and data-hiding parameters;

apply data revealing operation based on said information in said frame header to said dataset A' to generate a dataset A;

decompress and decode said dataset A;

decompress and decode said image data Pk';

combine said decompressed and decoded dataset A into said decompressed and decoded image data Pk' using said locations of dataset A' in image data Pk' to generate an image Pk;

apply at least one inverse wavelet transform to the image Pk and associated support space data k times by using an iteration index i with a starting value of k and each iteration generates a preview Pi−1 and decrements i by 1 until i is equal to 1 to generate an original image P0, where k is an integer greater than 1, wherein Pi is a quarter-size preview of Pi−1; and output image P0 for display.

26. A method for viewing protected image data comprising:

a video decoder obtaining a content protected image data frame comprising a frame header, a dataset A' and image data Pk', wherein said frame header includes information comprising a key, locations of dataset A' in image data Pk', the method of data hiding used, and data-hiding parameters;

said video decoder applying data revealing operation based on said information in said frame header to said dataset A' to generate dataset A;

said video decoder decompressing and decoding said dataset A;

said video decoder decompressing and decoding said frame data Pk';

said video decoder combining said decompressed and decoded dataset A into said decompressed and decoded image data Pk' using said locations of dataset A' in image data Pk' to generate an image Pk;

said video decoder applying at least one inverse wavelet transform to the image Pk and associated support space data k times by using an iteration index i with a starting value of k and each iteration generates a preview Pi−1 and decrements i by 1 until i is equal to 1 to generate an original image P0, where k is an integer greater than 1, wherein Pi is a quarter-size preview of Pi−1; and said video decoder outputting image P0 for display.

* * * * *